(12) United States Patent
Bylinskii et al.

(10) Patent No.: US 11,189,066 B1
(45) Date of Patent: Nov. 30, 2021

(54) SYSTEMS AND METHODS OF LEARNING VISUAL IMPORTANCE FOR GRAPHIC DESIGN AND DATA VISUALIZATION

(71) Applicant: ADOBE INC., San Jose, CA (US)

(72) Inventors: Zoya Bylinskii, San Jose, CA (US); Aaron Hertzmann, San Jose, CA (US); Bryan Russell, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/188,626

(22) Filed: Nov. 13, 2018

(51) Int. Cl.
  *G06T 11/60* (2006.01)
  *G06N 3/02* (2006.01)
  *G06T 11/00* (2006.01)

(52) U.S. Cl.
  CPC ........... *G06T 11/60* (2013.01); *G06N 3/02* (2013.01); *G06T 11/001* (2013.01)

(58) Field of Classification Search
  None
  See application file for complete search history.

(56) References Cited

U.S. PATENT DOCUMENTS

| | | | | |
|---|---|---|---|---|
| 2007/0025637 A1* | 2/2007 | Setlur | ................ | G06K 9/3233 382/276 |
| 2008/0019575 A1* | 1/2008 | Scalise | ............ | G06K 9/00234 382/118 |
| 2010/0013827 A1* | 1/2010 | Fillion | ................ | G06T 3/40 345/418 |
| 2015/0339525 A1* | 11/2015 | Marcelli | ............ | G06K 9/00416 382/161 |
| 2016/0275067 A1* | 9/2016 | Mei | ................ | G06F 40/186 |

OTHER PUBLICATIONS

Bylinskii et al. ("Learning Visual Importance for Graphic Designs and Data Visualizations", UIST 2017, Oct. 22-25, Quebec City, Canada (Year: 2017).*
Bylinskii et al., Learning Visual Importance for Graphic Design and Data Visualization, published Oct. 20, 2017, 10 pages.

(Continued)

*Primary Examiner* — Yanna Wu
(74) *Attorney, Agent, or Firm* — Shook, Hardy & Bacon L.L.P.

(57) ABSTRACT

Embodiments disclosed herein describe systems, methods, and products that train one or more neural networks and execute the trained neural network across various applications. The one or more neural networks are trained to optimize a loss function comprising a pixel-level comparison between the outputs generated by the neural networks and the ground truth dataset generated from a bubble view methodology or an explicit importance maps methodology. Each of these methodologies may be more efficient than and may closely approximate the more expensive but accurate human eye gaze measurements. The embodiments herein leverage an existing process for training neural networks to generate importance maps of a plurality of graphic objects to offer interactive applications for graphics designs and data visualizations. Based on the importance maps, the computer may provide real-time design feedback, generate smart thumbnails of the graphic objects, provide recommendations for design retargeting, and extract smart color themes from the graphic objects.

17 Claims, 23 Drawing Sheets

(56) References Cited

OTHER PUBLICATIONS

Shai Avidan et al., "Seam Carving for Content-Aware Image Resizing", Jul. 2007, 9 pages. https://dl.acm.org/citation.cfm?id=1276390 <https://protect-eu.mimecast.com/s/Qa3jC9Q6Jc94wl2FoOjds>; free link: http://graphics.cs.cmu.edu/courses/15-463/2012_fall/hw/proj3-seamcarving/imret.pdf <http://protect-eu.mimecast.com/s/2ocUC0VqwcZNA7mUDzp43>.

Ali Jahanian et al., "Autonomous Color Theme Extraction From Images Using Saliency", Mar. 2015, 8 pages. http://dx.doi.org/10.1117/12.2084051 <http://protect-eu.mimecast.com/s/QIPTCgLYRcpEzoGU2Cpz7>; free link: http://people.csail.mit.edu/jahanian/papers/AliJahanian_ColorThemeExtraction_EI2015.pdf <http://protect-eu.mimecast.com/s/XkFICjqQXUPoxBRC76Yg4>.

Binxing Jiao et al., "Visual Summarization of Web Pages", Jul. 19, 2010, 8 pages. https://dl.acm.org/citation.cfm?id=1835533 <https://protect-eu.mimecast.com/s/sfOVCkZQYh12JK5uJEhnG>; free link: http://citeseerx.ist.psu.edu/viewdoc/download?doi=10.1.1.187.1638&rep=rep1&type=pdf <http://protect-eu.mimecast.com/s/sxWiCI5QZhpRYVXUYQwr9>.

Sharon Lin et al., "Modeling How People Extract Color Themes from Images", Apr. 27, 2013, 10 pages. http://sharondlin.com/papers/colorThemes.pdf; <http://protect-eu.mimecast.com/s/Xhp9CmQR1cDyQgWtNQAz1>.

Peter O'Donovan et al., "Learning Layouts for Single-Page Graphic Designs", IEEE TVCG, vol. 20, No. 8, Aug. 2014, pp. 1-14. http://www.dgp.toronto.edu/~donovan/layout/designLayout.pdf; <http://protect-eu.mimecast.com/s/e8Z5CnrQ2sj9RPms0xFEx>.

Jaime Teevan, et al., "Visual Snippets: Summarizing Web Pages for Search and Revisitation", Apr. 2009, 11 pages. https://dl.acm.org/citation.cfm?id=1519008 <https://protect-eu.mimecast.com/s/5s5VCoQR3cZ2ygvU2FQD1> free link: https://www.microsoft.com/en-us/research/wp-content/uploads/2016/02/chi09-snippet.pdf; <https://protect-eu.mimecast.com/s/9yhOCpQw4cK4RVATv-10B>.

* cited by examiner

200a

200b

200c

200e 302  300a 304  300b

300c

300d

500a

700a

700b

700c

700d

SYSTEMS AND METHODS OF LEARNING VISUAL IMPORTANCE FOR GRAPHIC DESIGN AND DATA VISUALIZATION

TECHNICAL FIELD

This application relates generally to computer-based applications of trained neural networks to determine visual importance of various portions of graphic designs or data visualizations to enable adjustment of the graphic designs or the data visualizations.

BACKGROUND

A strategy of a computer-based graphic design or data visualization is to communicate a message to a viewer by including different design elements. The design elements are generally meant to cause the viewer to focus his or her attention and to better convey the information being presented. For example, graphic designers often try to convey important or salient, which is a form of importance, portions of graphic designs or data visualizations by use of a particular format or layout (e.g., a larger font) such that the viewer naturally focuses on these parts when viewing the graphic design. Such graphics are often in the form of advertisements, website, or other user interface designs. Therefore, understanding how viewers perceive salient information may be useful for many stages of a design process. However, salient information may be imperceptible to a graphic designer, so various tools have been developed to help graphic designers better understand and predict saliency.

The conventional solutions have several technical shortcomings. For example, one existing tool analyzes human eye gaze movements for natural images, such as photographs, to determine the salient portions of the natural images. However, it would be desirable to assess saliency without relying upon any measurement or analysis of eye gaze data. In another example, an existing tool trains a neural network based upon annotations made by humans. However, when creating new designs in a bitmap image format, it would be desirable to train a neural network that does not require any human annotations. In yet another example, a tool determining web page saliency requires programmatically-defined elements as inputs.

These and other conventional tools are trained using natural images, so the tools are not capable of operating at a pixel level, and therefore are not capable of processing a bitmap image of graphic design and data visualization. Furthermore, neural networks trained to determine saliency for natural images have historically been significantly inaccurate for determining importance of portions of bitmap images of graphic design or data visualization. For example, one tool trains a neural network to optimize a loss function containing a pixel level comparison of the output of the neural network and ground truth data, but this approach does not offer interactive applications to assist graphics designers.

As such, it is desirable to improve upon the technology for predicting importance of graphic design and data visualization to assist graphics designers and/or automatically adjust graphic designs or data visualizations.

SUMMARY

Systems and methods described herein address the technical shortcomings of the conventional solutions to predict importance of bitmap images of graphic designs and data visualizations (collectively referred to as graphic objects). The systems and methods train and utilize importance maps of graphic designs and data visualizations for various applications, such as real-time design feedback, smart thumbnails, design retargeting, and smart color theme extraction.

Disclosed herein are embodiments that solve the aforementioned technical problems and provide other benefits. A processing unit may include training one or more neural networks to optimize a loss function including a pixel-level comparison between (i) outputs generated by the neural networks and (ii) a ground truth dataset generated from a bubble view methodology or an explicit importance maps methodology. Each of these methodologies may be performed without human eye gaze measurements. The embodiments herein leverage an existing process for training neural network(s) to generate importance maps of graphic objects to offer interactive applications for graphic designs and data visualizations. Upon the input of a graphic object, the computer generates an importance map and provide a real-time design feedback for the inputted graphic object, generates a smart thumbnail of the graphic object, provides a recommendation for design retargeting of the inputted graphic object, and/or extract a smart color theme from the inputted graphic object.

In an embodiment, in a digital medium environment for predicting importance of a digital image, a method may include generating, by a computer with a neural network, an importance map of a graphic object, the importance map being a graphical representation showing each pixel of the graphic object within a range from least important to most important where a higher importance indicates a higher probability that the pixel is viewed by a viewer; receiving, by the computer, an instruction to modify a color of a set of pixels of the graphic object; generating, by the computer, a new graphic object having the modified set of pixels; and generating, by the computer with the neural network, an updated importance map based on the new graphic object having the modified set of pixels, wherein the updated importance map represents a modified probability of each pixel in the new graphic object.

In another embodiment, in a digital medium environment for resizing a digital image, a system may include at least one processor; a non-transitory computer memory comprising a neural network trained to generate importance maps; and instructions that, when executed by the at least one processor, cause the system to: execute the neural network to generate an importance map for a graphic object having a first set of dimensions, the importance map being a graphical representation showing each pixel of the graphic object within a range from least important to most important where a higher importance indicates a higher probability that the pixel is viewed by a viewer; identify a set of pixels in the graphic object being the least important based on the importance map; and in response to receiving an input of a second set of dimensions for the graphic object, generate a modified graphic object by removing the set of pixels being the least important when resizing the graphic object for the second set of dimensions.

In yet another embodiment, in a digital medium environment for generating a representation of a digital image, a method may comprise generating, by a computer with a neural network, an importance map for a graphic object, the importance map being a graphical representation showing each pixel of the graphic object within a range from least important to most important where a higher importance indicates a higher probability that the pixel is viewed by a viewer; identifying, by the computer with the neural network, a set of pixels in the graphic object being the least important based on the importance map; and generating, by the computer, a thumbnail object by removing the set of pixels being the least important when resizing the graphic object to dimensions of the thumbnail object.

BRIEF DESCRIPTION OF THE DRAWINGS

The accompanying drawings constitute a part of this specification and illustrate embodiments of the subject matter disclosed herein.

DETAILED DESCRIPTION

Figure 1A:
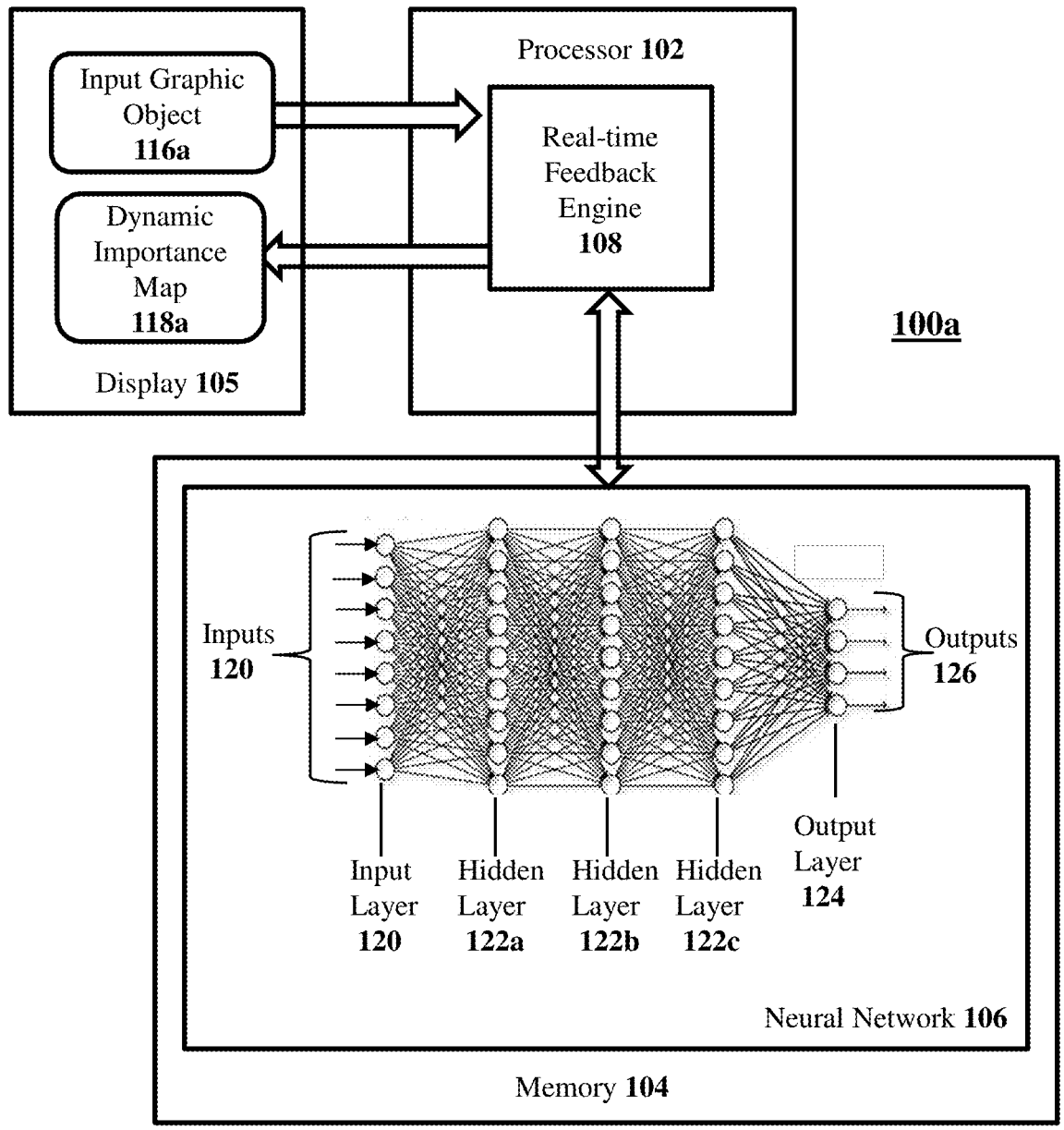
FIGS. 1A-1D are illustrations that show a system for generating and applying importance maps of graphic objects, according to an illustrative embodiment.
Figure 1B:
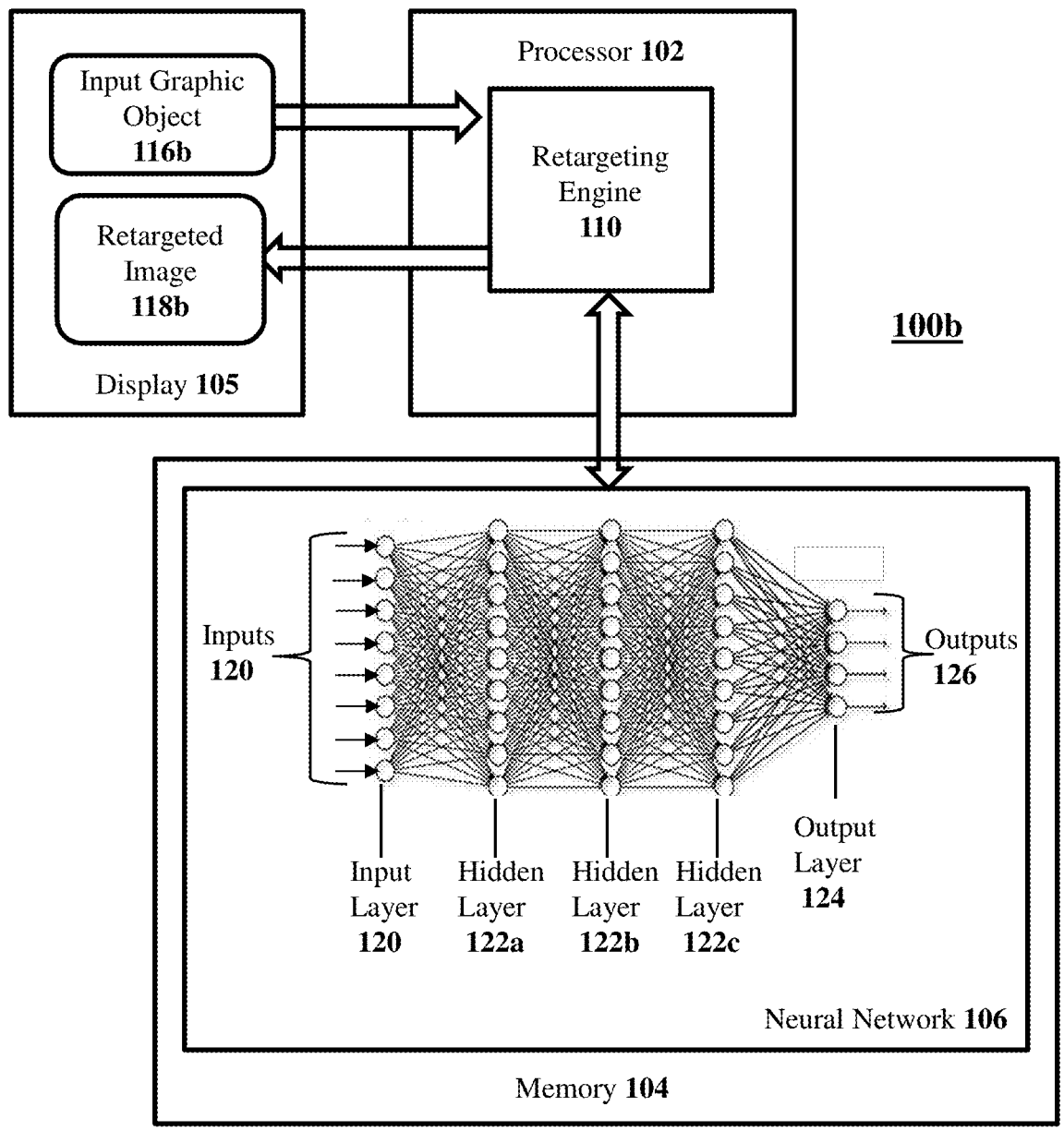
Figure 1C:
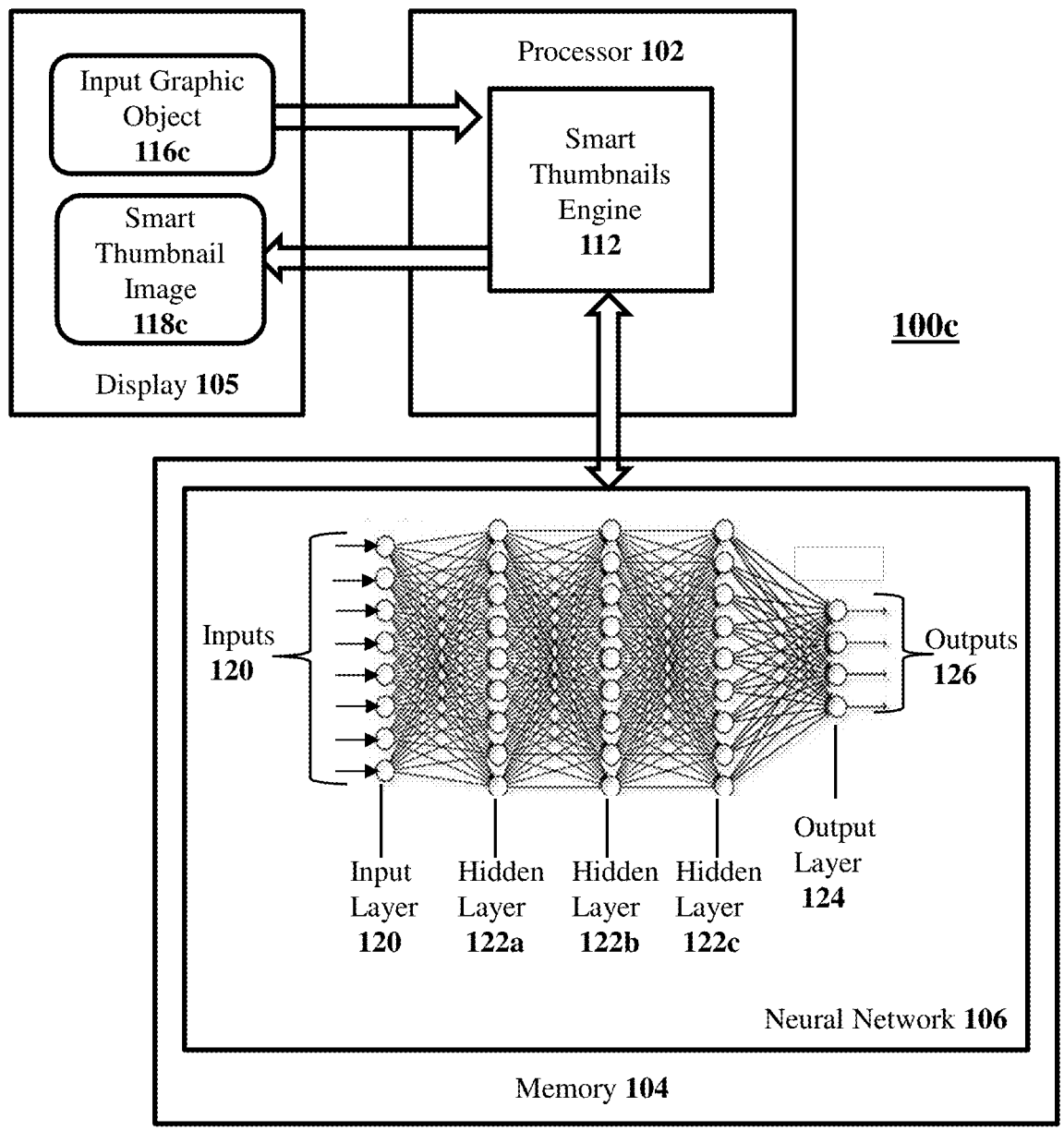
Figure 1D:
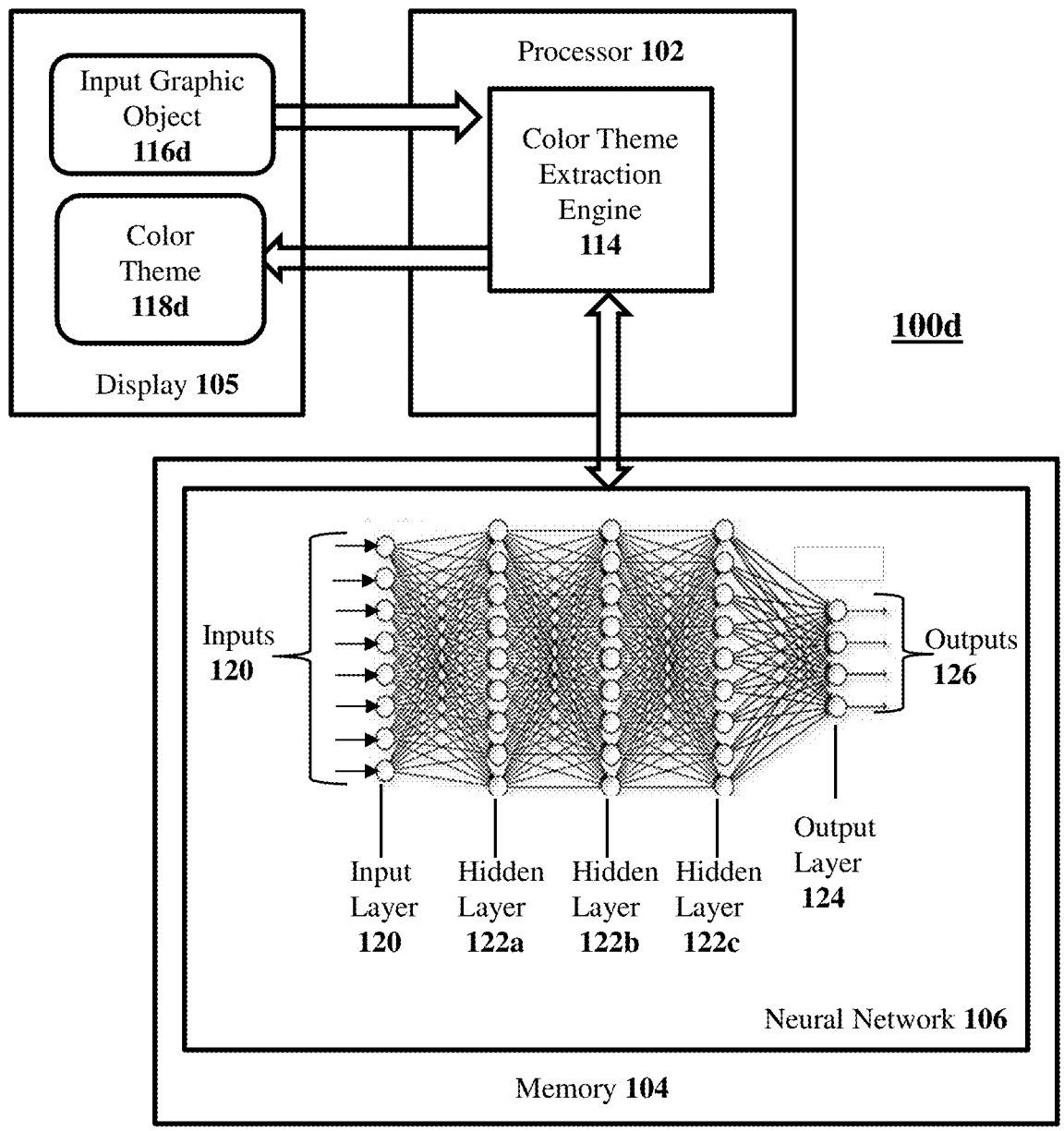

Embodiments described herein can determine an importance of portions of bitmap images of graphic design or data visualization without requiring human eye gaze measurements or annotations. To make such a determination, a neural network, trained to optimize a loss function containing a pixel level comparison of the output of the neural network and ground truth data, generates importance maps for inputted bitmap images. Importance maps may indicate the relative importance of various regions of a graphic design or data visualization. For instance, an importance map may be a graphical representation showing each pixel of the graphic object within a range from least important to most important where a higher importance indicates a higher probability that the pixel is viewed by a viewer. An importance map may, for example, show a color coded graphic object with different shades of colors overlaid on the graphic object showing the importance of the respective regions of the graphic object, analogous to a heat map. Embodiments disclosed herein may execute (or deploy) trained neural networks to generate importance maps for graphic designs. The embodiments may utilize the generated importance maps for diverse applications, such as providing real-time design feedback, performing design retargeting, generating smart thumbnails, and/or extracting smart color themes. Other functions may be supported by the neural network and/or importance map.

To provide a real-time design feedback, a computer may take in as an input a graphic object (which, as described above, may include one or more of graphic design and data visualization), execute (or deploy) a neural network on the input graphic object, and generate a graphical user interface displaying the design feedback. Real-time design feedback may range from displaying information on or near a graphic design as a user is creating a design or in response to a user submitting a design to an evaluator including the neural network. The real-time feedback may also store the feedback for the user to access. The design feedback may include, for example, an importance map of the input graphic object. As a user modifies the input graphic object, the computer may further deploy the neural network and update the importance map in real-time to provide a real-time feedback to the user. As a part of the design feedback, in addition to highlighting the regions that viewers are expected to look in the input design object, the computer may also highlight the regions of the design object that the viewers are likely or predicted to miss or not focus their attention. The computer may further provide feedback as to the consistency of viewing behavior. Consistency, as used herein, may be a measure of how a population of one or more viewers is predicted to behave relative to one or more other viewers. A graphic object with a high consistency score may indicate a prediction that viewers are likely to focus on common portions of the design. In contrast, a graphic object with a low consistency score may indicate a prediction that different viewers inconsistently and randomly look at regions within the graphic object. Consistency can be used to quantify design quality, under the assumption that a good design would lead to predictive viewing patterns across viewers.

Retargeting of graphic object may generate a new version of the graphic object with specific dimensions. Retargeting may be a common task for modern designers, who may have to work with many different output dimensions, such as different mobile device screen sizes and advertisement spaces with different dimensions. For retargeting, a computer may receive a bitmap image of a graphic object and new target dimensions. The computer may deploy a neural network to generate an importance map, and may utilize the importance map as an energy function to a seam carving algorithm. A seam carving algorithm may be a content aware image resizing algorithm that may function by establishing a number of seams in an image based on the importance map to automatically remove seams to resize the image. The computer may, by executing (or deploying) the neural network and the seam carving algorithm, generate a retargeted graphic object, where important regions such as title and visual are retained while the retargeted graphic object conforms to the new target dimensions.

Smart thumbnails may include important regions of a graphic object providing a visual summary of the graphic object. To generate a smart thumbnail, a computer may receive as input a bitmap image of a graphic object, and generate an importance map by deploying the neural network. The computer may then iteratively remove less important regions from the graphic object based on the importance map while preserving the spatial relationships between the important portions of the design object. More particularly, the computer may remove rows and columns of less important pixels until desired proportions are achieved. Once the less important contents are removed, the computer may blur the boundaries of the remaining elements using the importance map as an alpha-mask with a fade to white.

A color palette (or theme) for a design object may be a collection of a subset of colors of the design object. Color palettes may be used by designers to define the style of the design of the graphic object. To extract a color palette, the computer may receive a bitmap image of the graphic object. The computer may then deploy a neural network to generate an importance map of the graphic object. The computer may then sample colors from more important regions to generate a color palette for the graphic object. In some embodiments, a designer may specify a number of colors to be extracted for the color palette and the computer may generate a color palette containing the specified number of colors.

A computer may train one or more neural networks using bubble view and explicit importance map datasets as ground truth datasets. Ground truth datasets, as described herein, may include pre-classified data used to train the one or more neural networks by comparing the outputs of the one or more neural networks with the corresponding ground truth data. Conventional eye gaze measurements that are used to generate ground truth datasets of human attention, which are generally expensive and time consuming, and may not be feasible for practical purposes. The use of bubble view and explicit importance datasets are generally inexpensive, and provide close approximation of an eye gaze measurement. For training the neural network, the computer may optimize a loss (e.g., a sigmoid cross entropy loss) function containing a pixel-level comparison between the output generated by the neural network and the ground truth data. Each of the aforementioned applications may deploy the neural network for their respective functionalities.

As used herein, the term "importance" may be a term to describe perceived relative weighting of design elements within a graphic object. The conventional concept of image saliency may be a specific form of importance. The conventional notion of saliency may refer to bottom-up and/or pop-out effects in natural images. The notion of importance may also depend upon higher level factors such as semantic categories of design elements (e.g., title text, axis text, data points) within a graphic object.

FIGS. 1A-1D are illustrative systems 100*a*-100*d* (collectively system 100) for generating importance maps of graphic objects and utilizing the importance maps for diverse types of applications, according to an embodiment. As described above, a graphic object may be a graphic design, such as a poster or a data visualization (e.g., chart or a graph). As shown, the system 100 may comprise a processor 102, a non-transitory memory 104, and an electronic display 105. The processor 102 may be any kind of processor (e.g., general processor, digital signal processor, image processor, etc.) that may implement one or more instruction sets to enable the processing functionality of the system 100. The non-transitory memory 104 may be any type of memory from which the processor 102 may (i) read instructions and input data and (ii) write output data thereto. For example, the non-transitory memory 104 may include random access memory (RAM), cache memory, and/or any other type of memory. The non-transitory memory 104 may further include storage devices, such as hard disks, compact discs (CDs), flash drives, and/or any other type of computer storage.

The processor 102 may execute multiple engines (e.g., a real-time feedback engine 108, a retargeting engine 110, a smart thumbnails engine 112, a color palette (or theme) extraction engine 114) that may, in turn, execute a neural network 106 stored in the non-transitory memory 104. In other words, the processor 102, while executing the engines may also execute instructions and access data records forming portions of the neural network 106. When executed, the neural network 106 may generate an importance map (see, for example, importance map 208 of FIG. 2B) of one or more of the input graphic objects 116*a*, 116*b*, 116*c*, 116*d* (collectively 116), and based on the importance map, one or more of the engines 108, 110, 112, 114 may generate the respective outputs 118*a*, 118*b*, 118*c*, 118*d* (collectively 118). As shown, the processor 102 may receive the inputs 116 through the electronic display 105 and display the outputs 118 on the electronic display 105.

The real-time feedback engine 108 may receive the input graphic object 116*a* and may generate a dynamic importance map 118*a*. The dynamic importance map 118*a* may be a graphical representation showing each pixel of the graphic object within a range from least important to most important where a higher importance indicates a higher probability that the pixel is viewed by a viewer. For example, the dynamic importance map 118*a* may have shades of colors (e.g., color codes) overlaid on the pixels of the graphic object forming a heat-map of the different regions of the input graphic object 116*a*. The dynamic importance map 118*a*, through the color codes, may show predictions generated by the feedback engine 108 as to where viewers are expected to look at the input graphic object 116*a*. The real-time feedback engine 108 may also indicate the portions of the input graphic object 116*a* that the viewers may be more likely to miss. For example, the real-time feedback engine 108 may darken portion of the input graphics object 116*a* that the viewers may be more likely to miss. The real-time feedback engine 108 may also display a viewing consistency score of the graphic object 116*a*. The viewing constancy score may indicate how a viewer's viewing behavior is guided in the graphics object. A high consistency score may indicate that a viewer looks at a design with a relatively smoother, consistent movement (e.g., moving from left to right). A lower consistency score may indicate that the user may have a scattershot look at the design, jumping from one region to another, without a consistent pattern. It should be understood that the real-time feedback engine 108 is merely illustrative, and other feedback engines that may generate importance maps and/or provide feedback based the importance maps not necessarily in real-time (e.g., batch processing) should be considered within the scope of this disclosure.

The retargeting engine 110 may retarget the input graphic object 116*b* to generate a retargeted image 118*b* of the input graphic object based on new target dimensions or form factors. Retargeting is a common task for modern design tools because the input graphic object 116*b* may have to be targeted for different screen sizes, ranging from televisions to mobile devices with a plurality of screen dimensions. Furthermore, the input graphic object 116*b* may have to retargeted for other space/aspect ratio constraints, e.g., for different websites and different parts of webpages such as the main content portion or the margins. Unlike conventional methods that require an underlying vector representation of a design, the retargeting engine 110 may operate on the input graphic object 116*b* that may be a bitmap image without additional annotations. To generate the retargeted image 118*b*, the retargeting engine may first execute (or deploy) the neural network 106 to generate an importance map of the input graphic object 116*b*. The retargeting engine 110 may then utilize the generated importance map as an energy function to a seam carving algorithm to remove less important regions from the input graphic object 116*b* and generate the retargeted image 118*b* conforming to new target dimensions.

The smart thumbnails engine 112 may generate a smart thumbnail image 118*c* of the input graphic object 116*c*. Unlike conventional methods, the smart thumbnails engine 112 may not require an underlying vector representation of an input and function on the input graphic object 116*c* that may be in bitmap form. To generate the smart thumbnail image 118*c*, the smart thumbnails engine 112 may first deploy the neural network 106 to generate an importance map for the input graphic object 116*c*. The smart thumbnails engine 112 may then iteratively remove seams of the input graphic object 116*c* with lower importance. In particular, the smart thumbnails engine 112 may remove rows and columns of the input graphic object 116*c* with less important pixels until the desired proportions (e.g., equal length and breadth for a square smart thumbnail image 118*c*) are achieved. After removing the less important content, the smart thumbnails engine 112 may blur the boundaries of the remaining content using the importance map as an alpha-mask with a fade-to-white to generate the smart thumbnail image 118*c*. For example, the smart thumbnail image 118*c* for a graphic object that is a data visualization may include title and other main supporting text, as well as data extremes—in case of a data table, top and bottom of the table, and in case of a data plot, left and right sides of the data plot.

The color theme extraction engine 114 may extract the important colors from the input graphic object 116*d* to generate a color theme 118*d* (e.g., a color palette) containing the important colors in the input graphic object 116*d*. In some embodiments, the input graphic object 116*d* may be a bitmap image. To generate the color theme 118, the color theme extraction engine 114 may first deploy the neural network 106 to generate an importance map for the input graphic object 116*d*. The color theme extraction engine may than select colors from the more important regions in the importance map and use the selected colors for the color theme 118*d*.

The neural network 106, as described herein, may contain an input layer 120, hidden layers 122*a*, 122*b*, 122*c* (collectively referred to as 122), and an output layer 124. In some embodiments, the neural network 106 may be a convolutional neural network. As described above, one or more of the engines 108, 110, 112, 114 may deploy the neural network 106 to generate the respective outputs 118 from the inputs 116. More particularly, the engines 108, 110, 112, 114 may provide as inputs 120 to the neural network 106 the respective input graphic objects 116 and receive outputs 126 indicating the pixel level importance of the input graphic objects 116. The neural network 106 may have been trained to optimize a loss (e.g., a sigmoid cross entropy loss) function containing a pixel level comparison between the output generated by the neural network and the ground truth data. The ground truth data may be bubble view data or explicit importance maps.

Figure 2A:
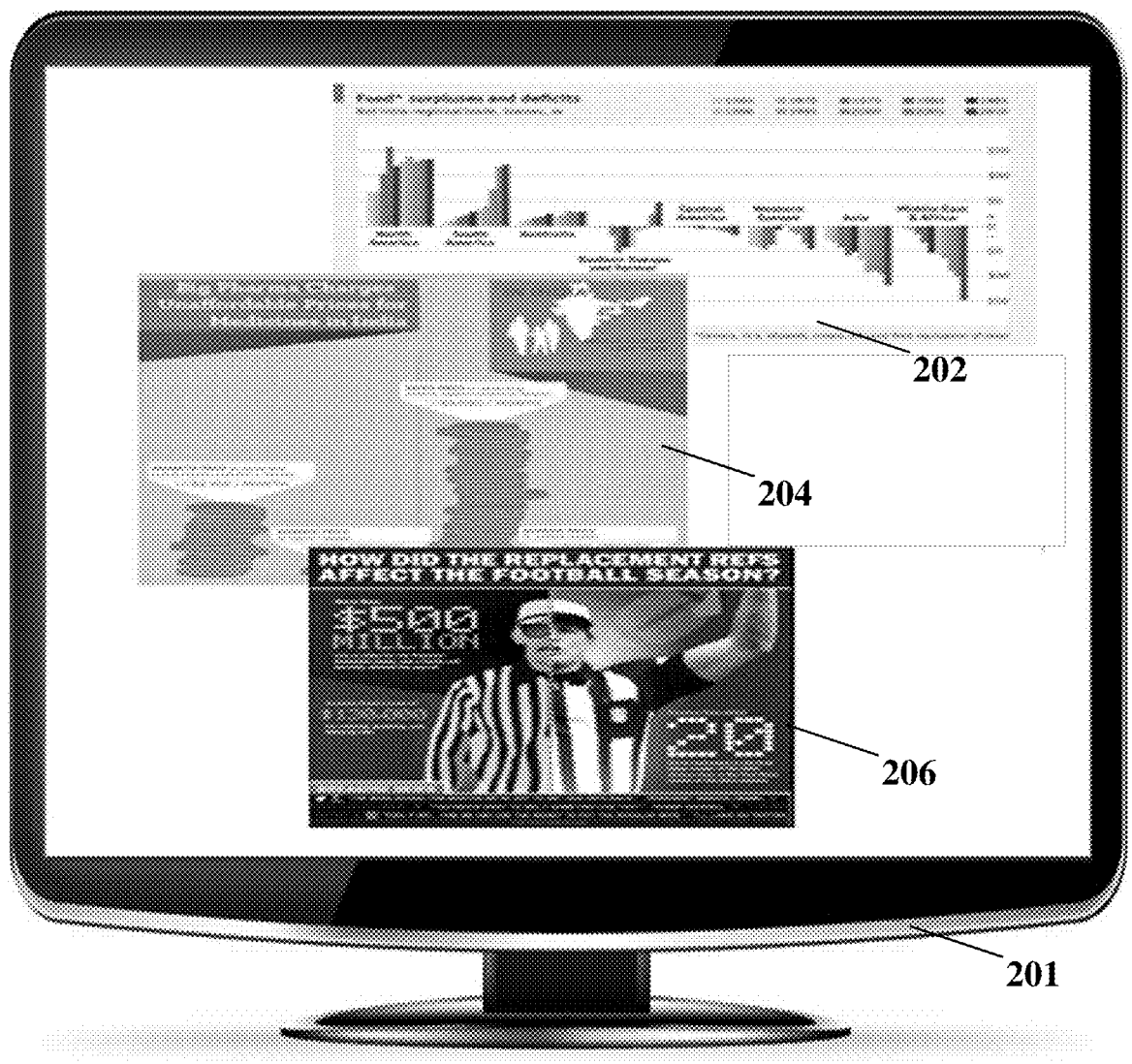
FIGS. 2A-2E are graphical user interfaces displaying input graphic objects and computer generated real-time feedback maps for the input graphic objects highlighting regions viewers are more likely to focus, according to an illustrative embodiment.

FIG. 2A is an illustrative graphical user interface (GUI) 200*a* displayed on an electronic display 201 displaying a first graphic object 202, a second graphic object 204, and a third graphic object 206. As shown, the first graphic object 202 may be a data visualization (e.g., containing a bar-graph), the second graphic object 204 may be a sales graphic (e.g., containing a sales graphic in a geographic region), and the third graphic object 206 may be graphic designs (e.g., containing a poster). The graphical user interface 200*a* may have been generated by a computer as input interface to generate importance maps for the graphic objects 202, 204, 206.

Figure 2B:
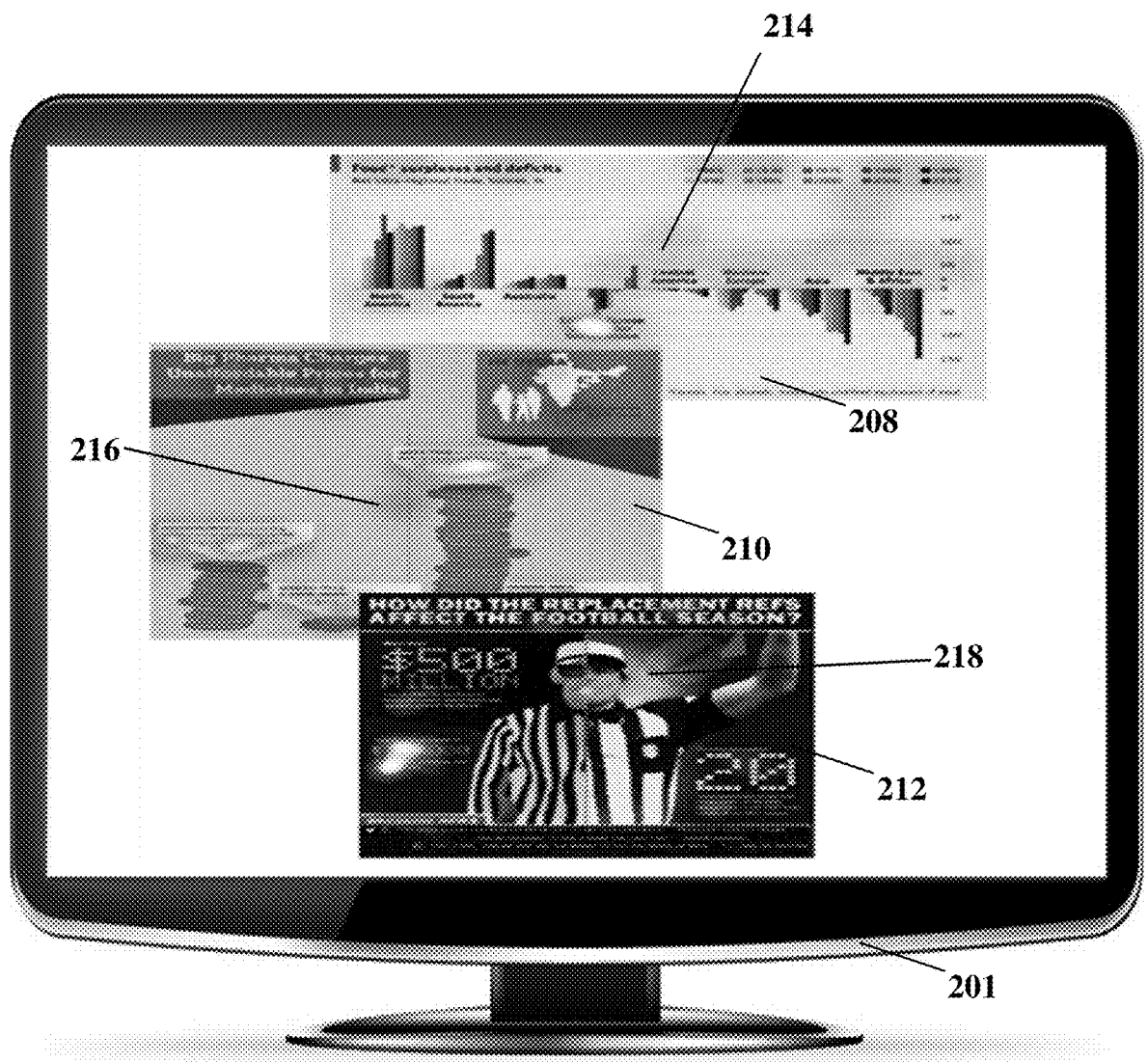

FIG. 2B is an updated GUI 200*b* displaying a first importance map 208 corresponding to the first graphic object 202, a second importance map 210 corresponding to the second graphic object 204, and a third importance map 212 corresponding to the third graphic object 206. Within the importance maps 208, 210, 212, the computer may calculate and show important regions with color codes or predetermined shades of colors. Other techniques for highlighting important regions of graphics objects may be utilized. For example, within the importance map 208, an important region is labeled as 214; within the importance map 210, an important region is labeled as 216; and within the importance map 212, an important region is labeled as 218. Each of these importance maps 208, 210, 212 with the corresponding important regions, such as 214, 216, 218 may have been generated by the computer deploying a neural network trained to optimize a loss function containing a pixel level comparison of the output and ground truth data.

Figure 2C:

FIG. 2C is a GUI 200*c* generated by a computer to provide dynamic importance maps based on input graphic objects. Within the GUI 200*c*, an input graphic object 220 is displayed. The computer may deploy a neural network to generate an importance map 222 corresponding to the input graphic object 220. The importance map 222 may be a graphical representation showing each pixel of the graphic object within a range from least important to most important where a higher importance indicates a higher probability that the pixel is viewed by a viewer. Within the importance map 222, the computer may color code pixels or overlay shades of colors on the pixels based upon the importance of the pixels. An illustrative important region formed by a group of important pixels is shown as region 224.

Figure 2D:

FIG. 2D is an updated GUI 200*d* generated by the computer based upon a change in the input graphic object 220 (FIG. 2C), i.e., when the input graphic object 220 is modified to input graphic object 226. To modify the input graphic object 220, the computer may receive an instruction to modify a color of a set of pixels of the graphic object 220. For example, the color of the text has been changed from the input graphic object 220 to the input graphic object 226 based on an instruction received by the computer to modify the color of a set of pixels forming the text. Based on this modification, the computer may generate an updated importance map 228 and display the same in the updated GUI 200*d*. The updated importance map 228 may represent a modified probability of each pixel in the input graphic object 226. Within the updated importance map 228, an illustrative important region formed by a set of pixels each having a higher modified probability has been labeled as region 230.

Figure 2E:

FIG. 2E is another updated GUI 200*e* generated by the computer based on an update to the input graphic object 220. To modify the input graphic object 220, the computer may receive an instruction to modify a color of a set of pixels of the graphic object 220. As shown, text has been resized and rearranged in input graphic object 220 to generate an updated input graphic object 234 based on an instruction received by the computer to modify the color of a set of pixels forming the text. In the updated GUI 200*e*, the computer may display an updated importance map 236. The updated importance map 236 may represent a modified probability of each pixel in the input graphic object 234. Within the updated importance map 236, an important region formed by a set of pixels each having a higher modified probability has been labeled as 240.

As shown in FIGS. 2C-2E and described hereinabove, the computer may dynamically update importance maps in real-time as an input graphic object is being edited/updated. An instruction to edit/update the input graphic object may include, for example, an instruction to resize a text or an image in the graphic object, an instruction to change font of a text in the graphic object, an instruction to change a color of a text or an image in the graphic object, and an instruction to move a text or an image in the graphic object. The computer may provide dynamic feedback to a designer by dynamically modifying an importance map being displayed on the input graphic object as an input graphic object is being modified in real-time based on the instruction.

Figure 3A:
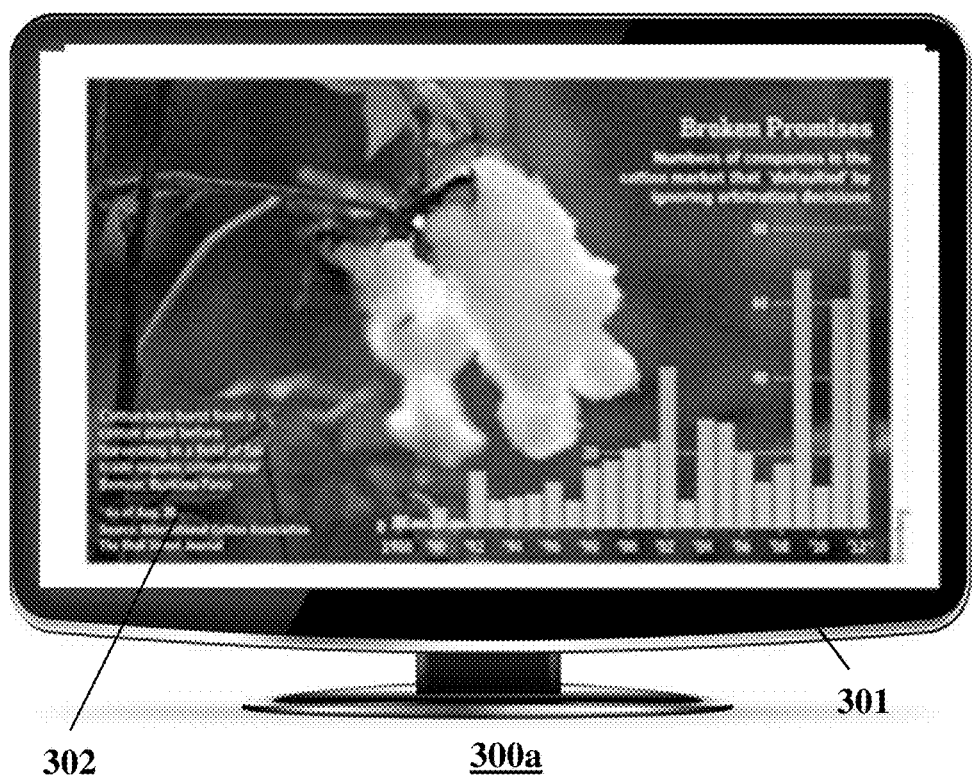
FIGS. 3A-3F are graphical user interfaces displaying input graphic objects and computer generated real-time feedback maps for the input graphic objects highlighting regions of the input graphic objects that the viewers are more likely to miss, according to an illustrative embodiment.
Figure 3B:
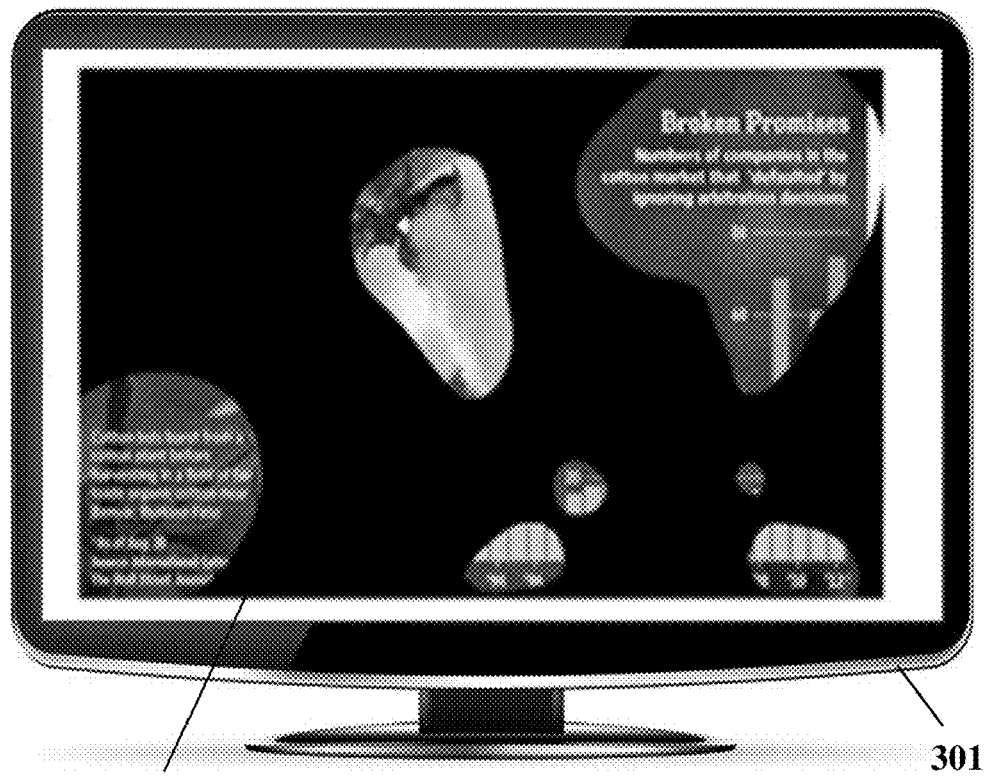
Figure 3C:
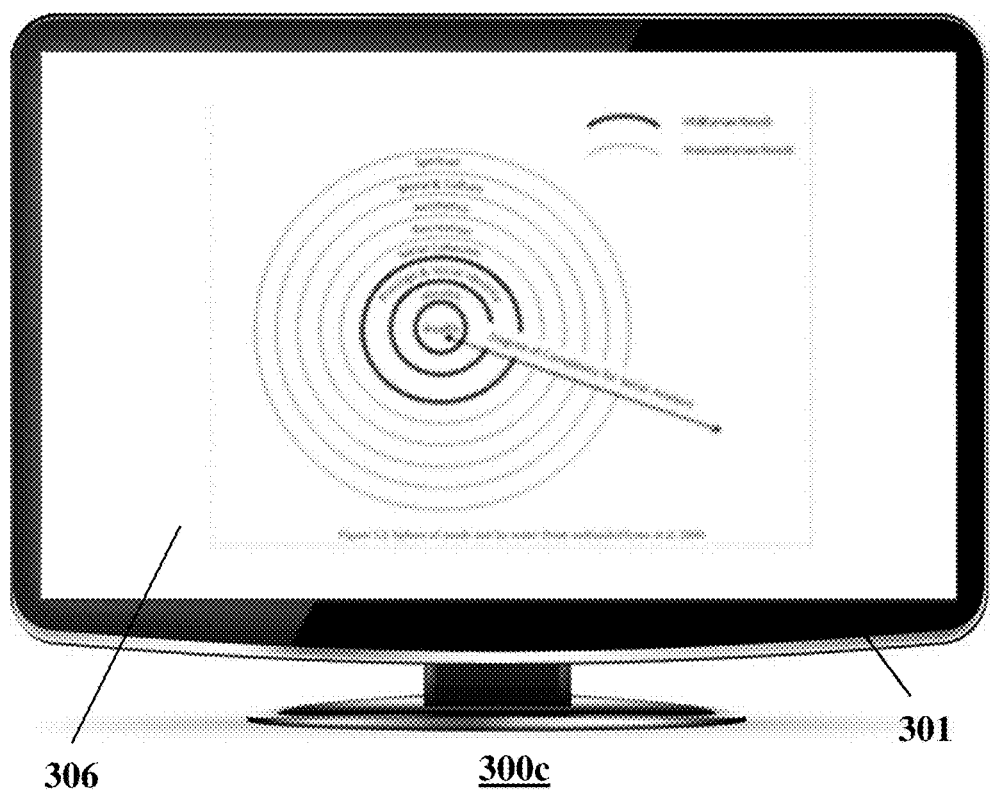
Figure 3D:
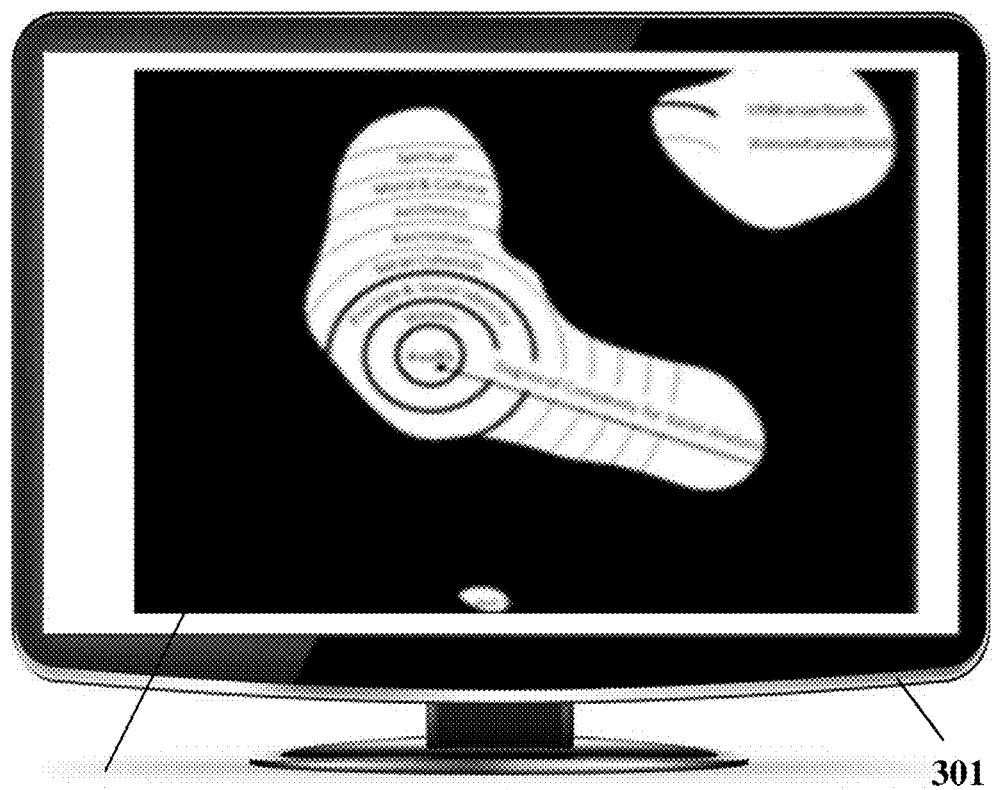
Figure 3E:
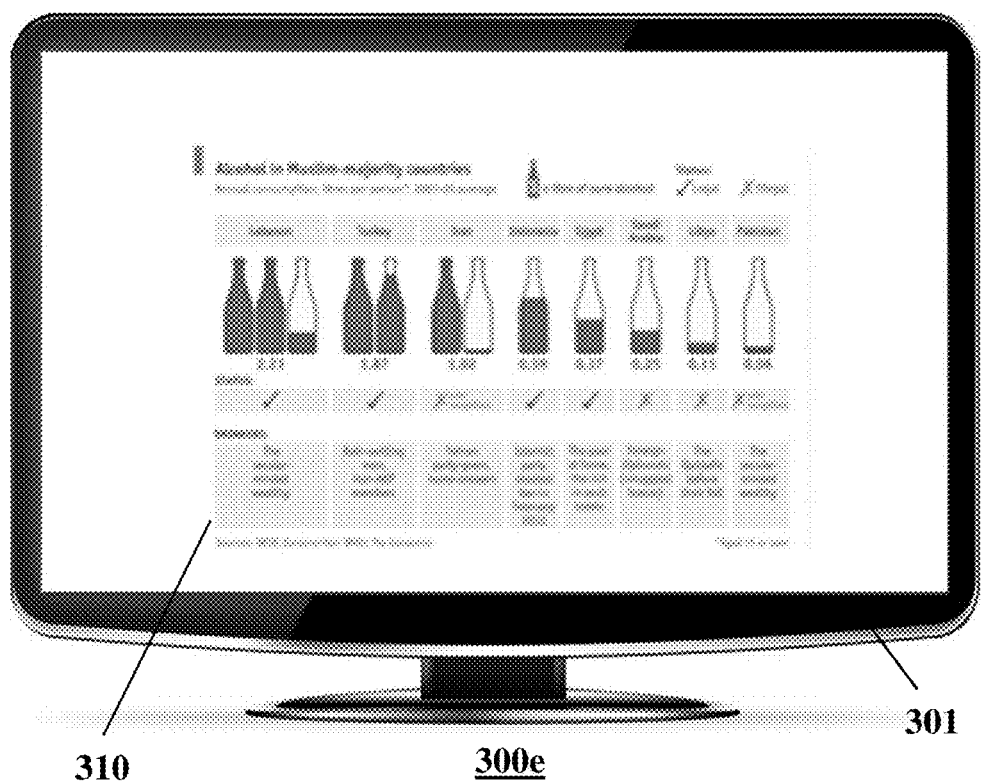
Figure 3F:
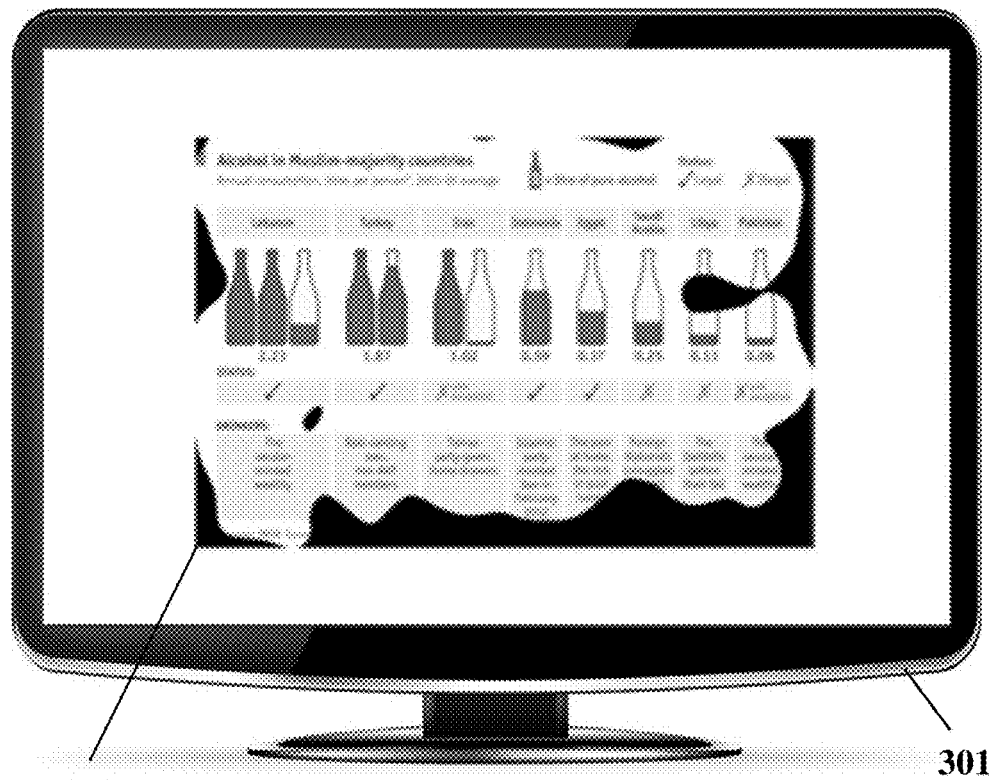
Figure 4A:
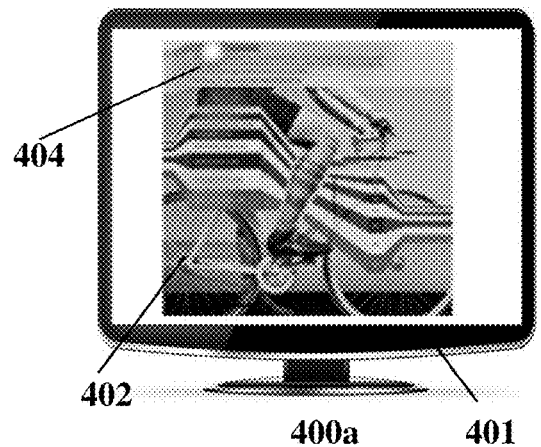
FIGS. 4A-4J are graphical user interfaces displaying input graphic objects and computer generated real-time feedback maps for the input graphic objects highlighting consistency of viewing behavior, according to an illustrative embodiment.
Figure 4B:
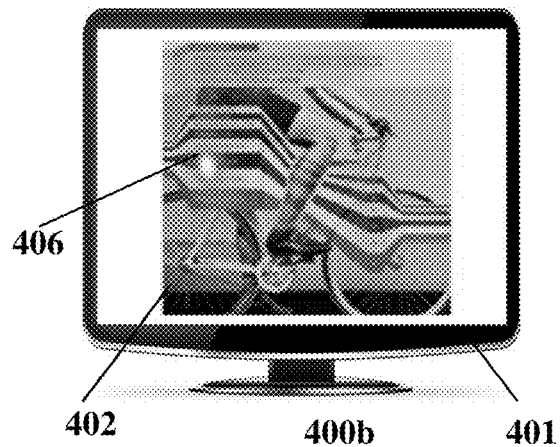
Figure 4C:
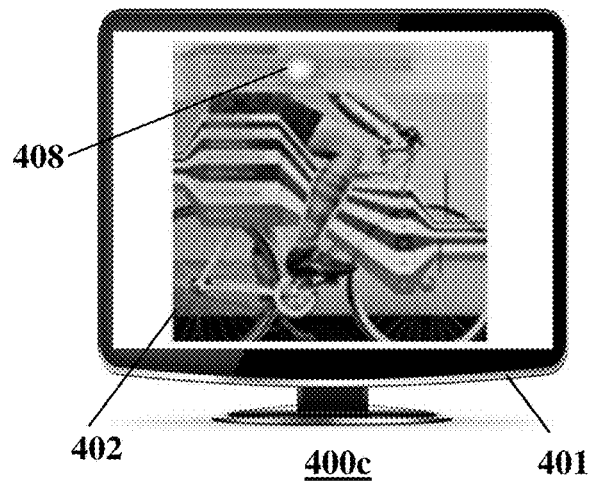
Figure 4D:
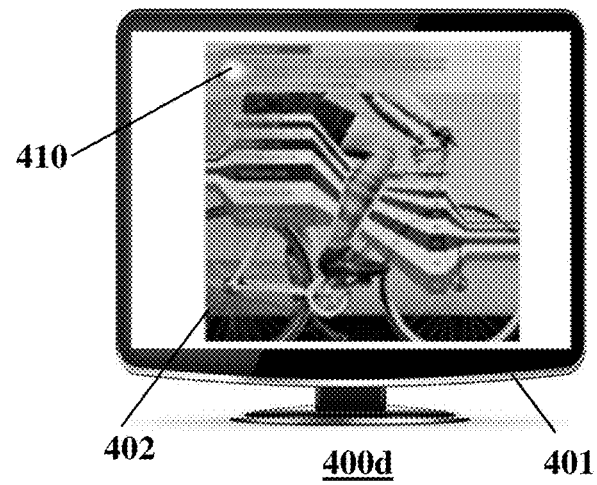
Figure 4E:
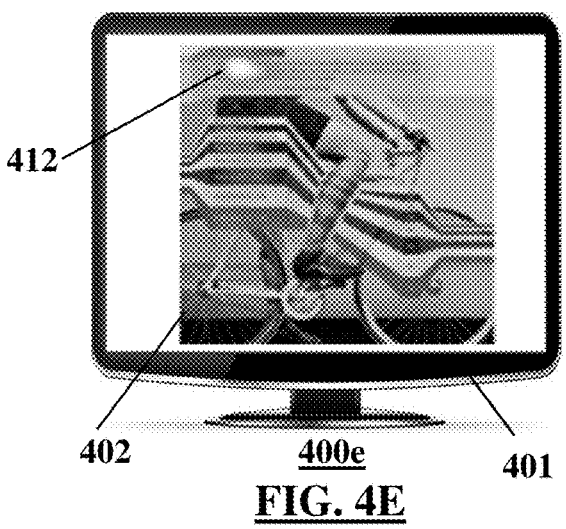
Figure 4F:
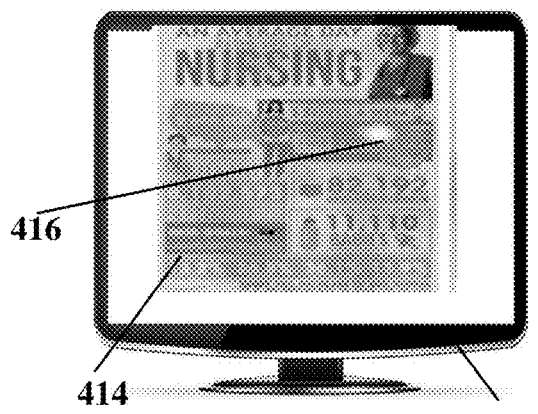
Figure 4G:
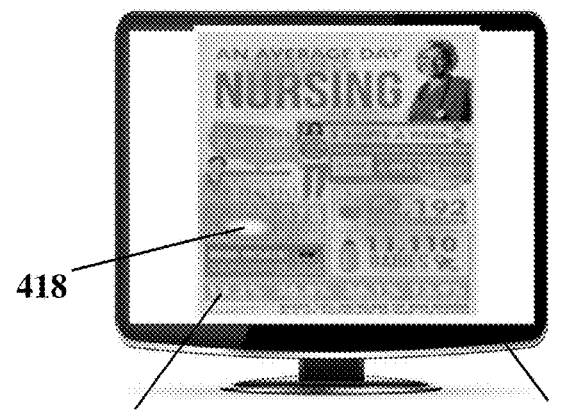
Figure 4H:
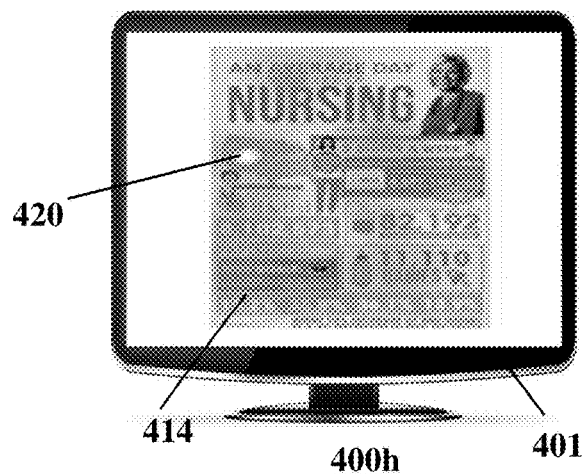
Figure 4I:
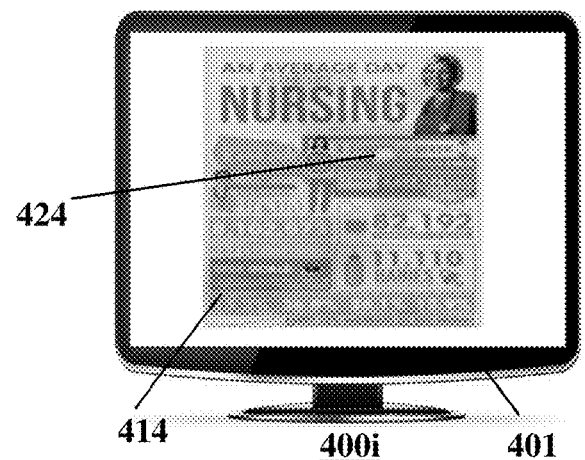
Figure 4J:
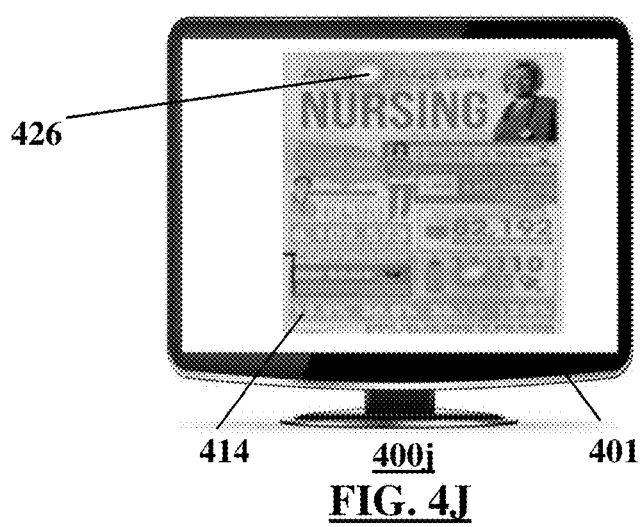

FIG. 3A is a GUI 300a displaying an input graphic object 302 on an electronic display 301. A computer may utilize a neural network to process the input graphic object 302 to generate an importance map. Based on the importance map, the computer may generate an updated GUI 300b (shown in FIG. 3B) showing regions 304 that viewers may be likely to miss. FIG. 3C is a GUI 300c displaying an input graphic object 306. The computer may utilize the neural network to process the input graphic object 306 to generate a corresponding importance map. Based on the importance map, the computer may generate an updated GUI 300d (shown in FIG. 3D) showing regions 308 that viewers may be likely to miss. FIG. 3E shows a GUI 300e displaying an input graphic object 310. The computer may deploy the neural network on the input graphic object 310 to generate a corresponding importance map. Based on the importance map, the computer may generate an updated GUI 300f (shown in FIG. 3F) showing regions 312 that viewers may likely miss. The computer may generate the respective updated GUIs 300b, 300d, 300f with the corresponding regions 304, 308, 312 that the viewers may likely miss in real-time to provide a real-time feedback on the respective input graphic objects 302, 306, 310. It should be understood that the importance maps may have any other representation to provide feedback to the designer.

FIGS. 4A-4E are GUIs 400a, 400b, 400c, 400d, and 400e, shown on an electronic display 401, displaying predicted viewing behavior on an input graphic object 402. A computer may generate the successive GUIs 400a, 400b, 400c, 400d, and 400e to display importance maps indicating a population of viewers' viewing behavior on the input graphic object 402. The computer may generate the importance maps by utilizing a neural network, as previously described. As shown in the GUIs 400a, 400b, 400c, 400d, and 400e, important regions 404, 406, 408, 410, and 412 are localized and may consistently guide viewing behavior. For example, the important regions 404, 406, 408, 410, and 412 move linearly in a left-right axis, such that a population of viewers may consistently view more important information as opposed to randomly gazing at different portions of the input graphic object 402. Based on the population of viewers' predicted viewing behavior, the computer may determine that the input graphic object 402 may have a high consistency score.

FIGS. 4F-4J are GUIs 400f, 400g, 400h, 400i, and 400j displaying predicted viewing behavior on an input graphic object 414. The computer may generate the successive GUIs 400f, 400g, 400h, 400i, 400j to display importance maps indicating a population of viewers' viewing behavior in the input graphic object 414. The computer may generate the importance maps by deploying the neural network. As shown in the GUIs 400f, 400g, 400h, 400i, and 400j, the important regions 416, 418, 420, 422, 424, and 426 are scattered at different portions of the input graphic object 414. In other words, the input graphic object 414 may not provide a consistent viewing behavior and may therefore have a low or lower consistency score.

Figure 5A:
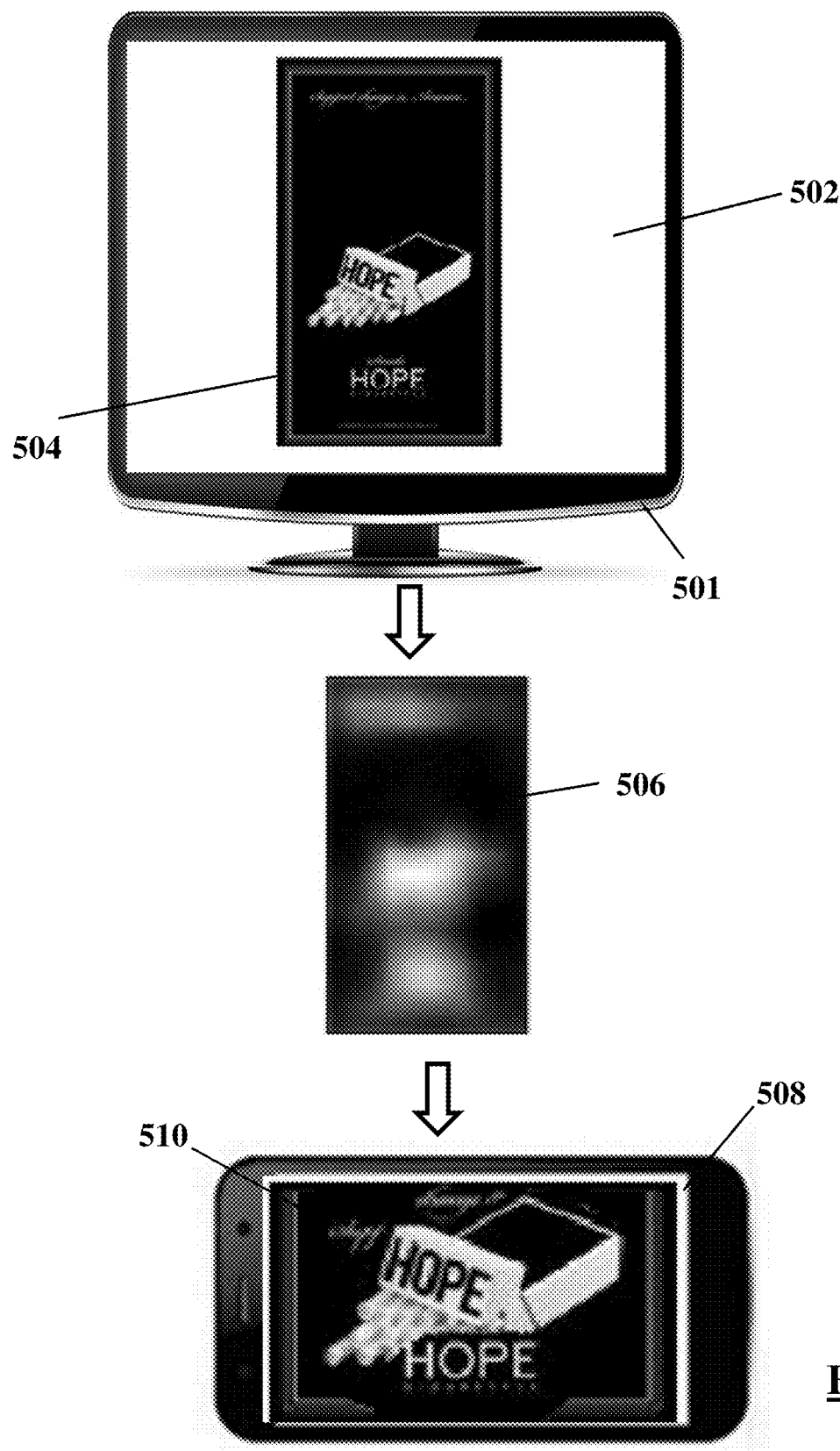
FIGS. 5A-5B are process diagrams of a process for retargeting of a graphic object, according to an illustrative embodiment.

FIG. 5A is a process diagram 500a for retargeting an input graphic object, according to an illustrative embodiment. A graphic object 504 may be designed for a GUI 502 displayed on an electronic display 501 by a computer (not shown). The computer may receive a retargeting request with dimensions of a new GUI 508. For retargeting, the computer may utilize a neural network to generate an importance map 506. The computer may then execute a seam carving algorithm to remove the unimportant portions to generate a resized image 510 retargeted for the new GUI 508.

Figure 5B:
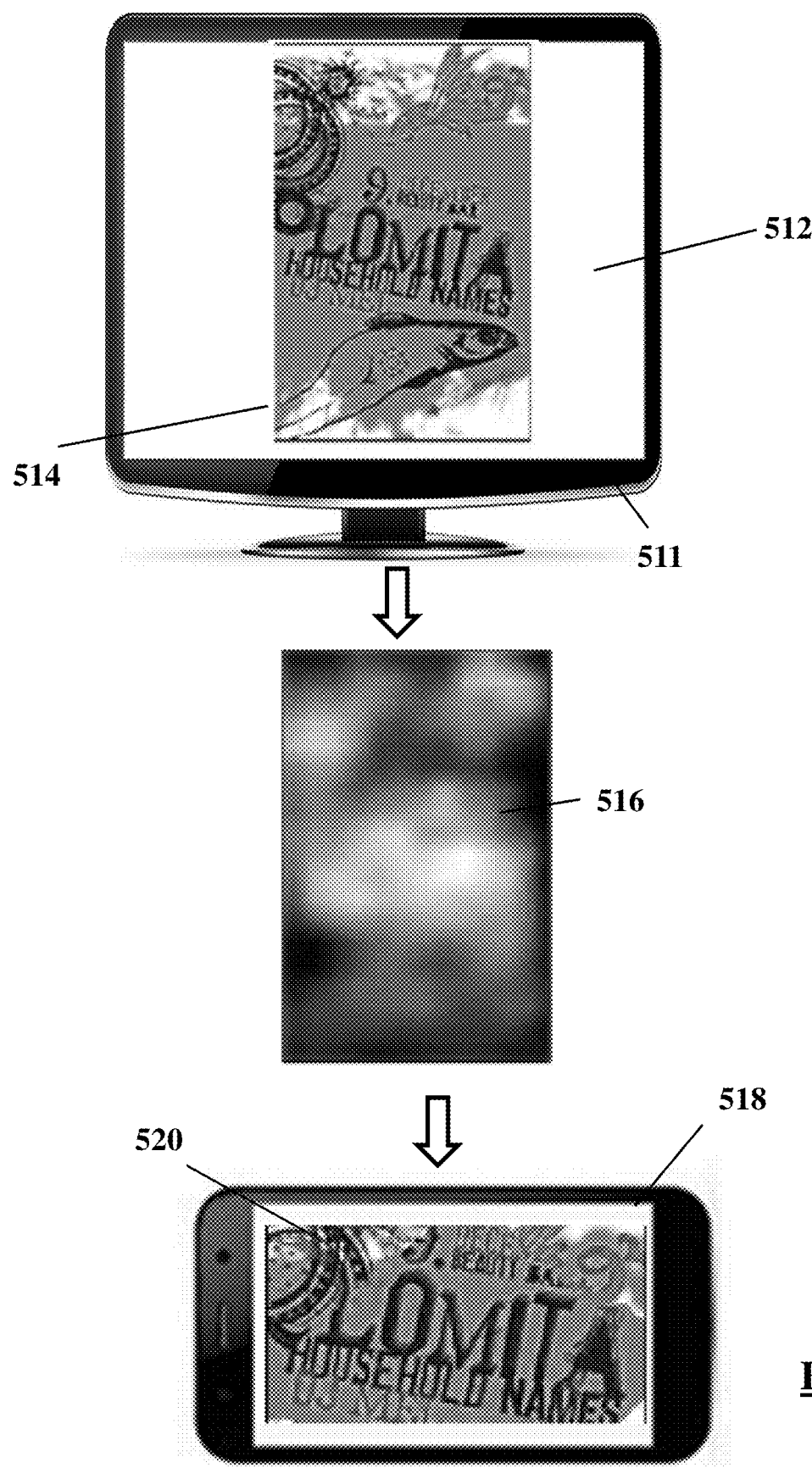

FIG. 5B is a process diagram 500b for retargeting an input graphic object, according to an illustrative embodiment. A graphic object 514 may be designed for a GUI 512 displayed on an electronic display 511 by a computer (not shown). The computer may receive a retargeting request with dimensions of a new GUI 518. For retargeting, the computer may utilize a neural network to generate an importance map 516. The computer may then execute a seam carving algorithm to remove the unimportant portions (e.g., portions with least important pixels) to generate a resized image 520 retargeted for the new GUI 518. It should be understood that the retargeting of the input graphic objects 504, 514 in FIGS. 5A, 5B for the new GUIs 508, 518 is merely for illustration. Using the embodiments herein, the computer may retarget the input graphic objects 504, 514 for multiple space constraints. For example, the computer may retarget the input graphic objects 504, 514 for different portion of a webpage such as the main content portion or the margins abutting the main content portion. Within the GUIs 502, 508, 512, 518, the computer may retarget the input graphic objects 504, 514 for different locations. For example, one or more of the GUIs 502, 508, 512, 518 may have an inset or a preview window (both not shown), and the computer may retarget the input graphic objects 504, 514 to fit the dimensions of the inset or the preview window. Regardless of the target dimensions, the computer, using the embodiments herein, may preserve the important portions of the input graphic object.

In some embodiments, the computer may utilize the underlying vectors associated the input graphic objects 504, 514 to perform retargeting. The underlying vectors may indicate whether portions of the input graphic objects 504, 514 contain images, text, or any other form of content. After generating the respective importance maps 506, 512 from the bitmap images of the input graphic objects 504, 514, the computer may overlay the underlying vectors on the importance maps 506, 512 to retarget the input graphic objects 504, 514. For example, if the underlying vector indicates that there is an image on a portion of the input graphic object 504, the computer, using such indication, may keep the whole image on the resized image 510 even though only a section of the image may have been identified as important in the importance map 506.

Figure 6:
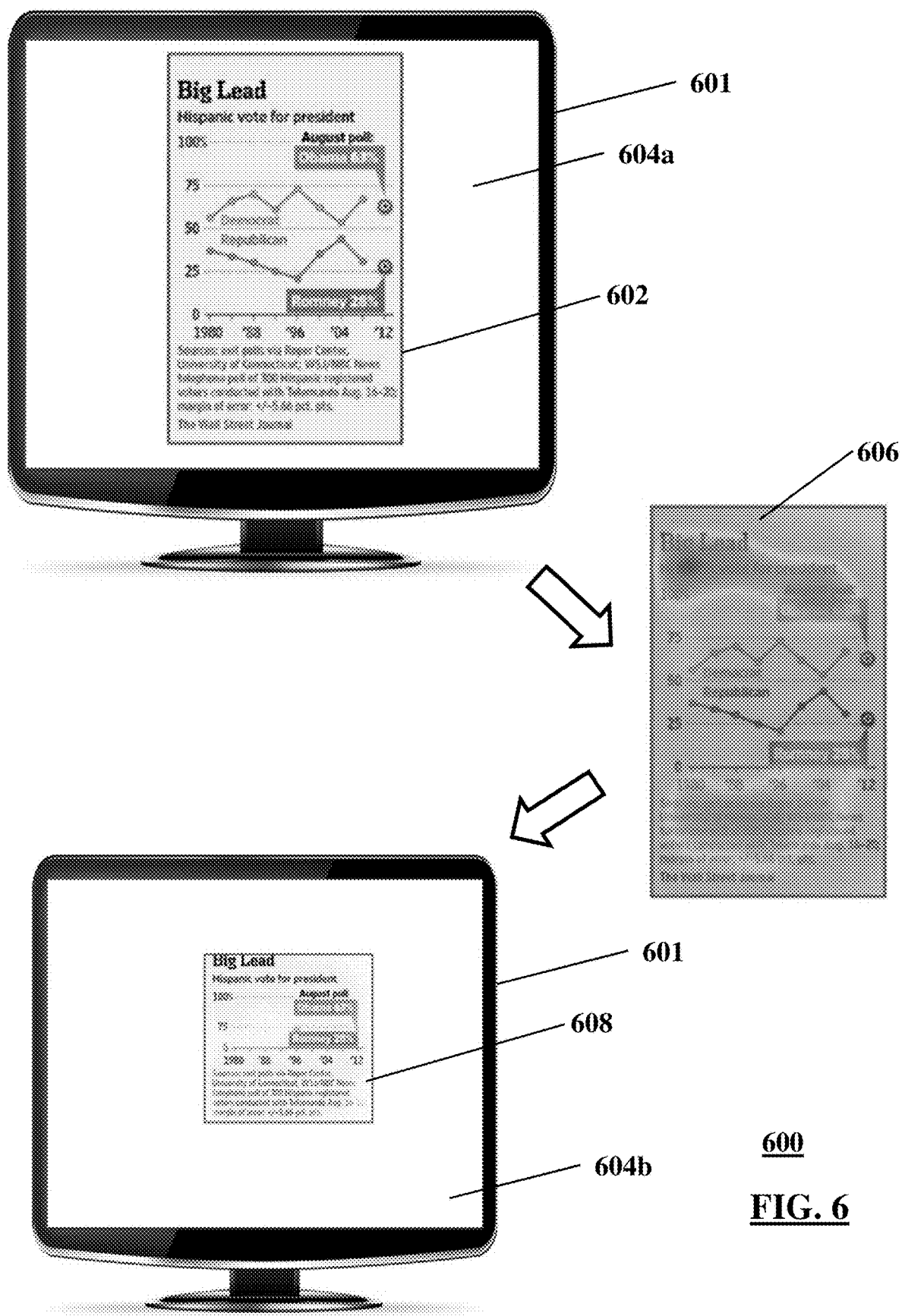
FIG. 6 is a process diagram of a process for generating a smart thumbnail of an input graphic object, according to an illustrative embodiment.

FIG. 6 is a process diagram 600 for generating a smart thumbnail from an input graphic object, according to an illustrative embodiment. A graphic object 602 is shown displayed on GUI 604a in an electronic display 601 by a computer (not shown). A computer may deploy a neural network to generate an importance map 606 for the graphic object 602. The computer may thereafter iteratively remove seams with lower importance (e.g., seams with least important pixels) until the desired proportions (e.g., equal length and breadth for a square thumbnail). A smart thumbnail 608 is shown in an updated GUI 604*b*.

Figure 7A:
FIG. 7A-7D are graphical user interfaces displaying input graphic objects and computer smart color themes for the corresponding input graphic objects, according to an illustrative embodiment.
Figure 7B:

FIG. 7A is a GUI 700*a*, in an electronic display 701 by a computer (not shown), displaying an input graphic object 702, according to an illustrative embodiment. A designer may provide the input graphic object 702 to the computer with an instruction to extract color themes from the input graphic object 702. The computer may utilize a neural network to generate an importance map for the input graphic object 702. Utilizing the importance map, the computer may extract a color theme (or a color palette) containing colors from the important regions (e.g., regions containing most important pixels) of the input object 702. FIG. 7B shows an updated GUI 700*b* displaying the regions (an example is labelled as 704) from which colors may be extracted for a color theme corresponding to the input graphic object 702.

Figure 7C:
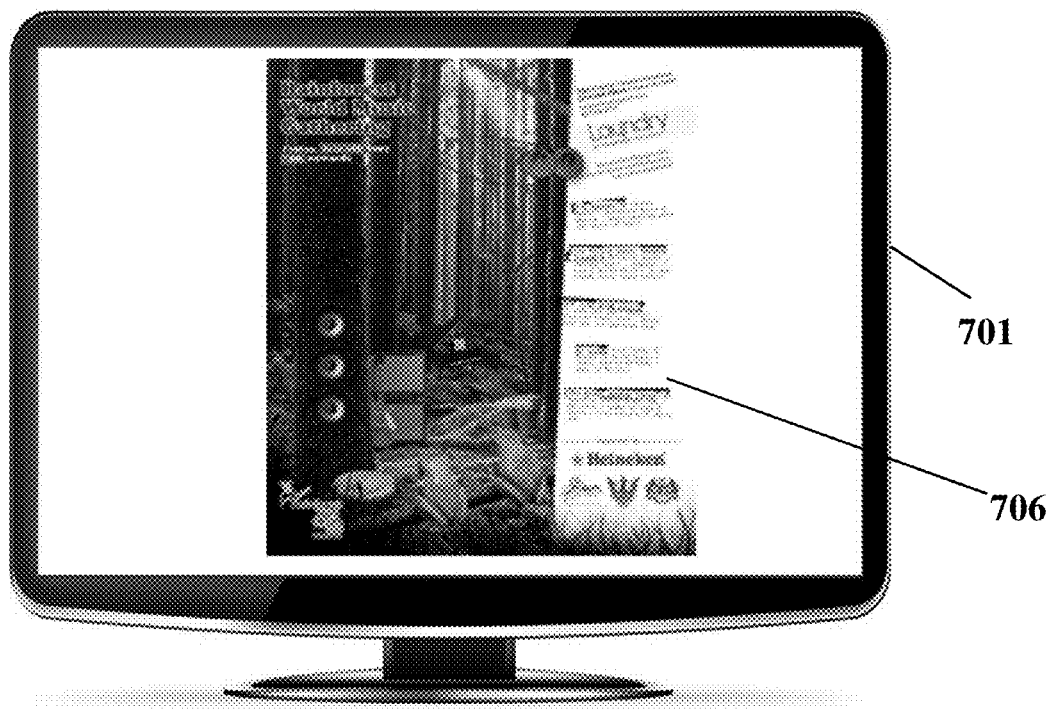
Figure 7D:
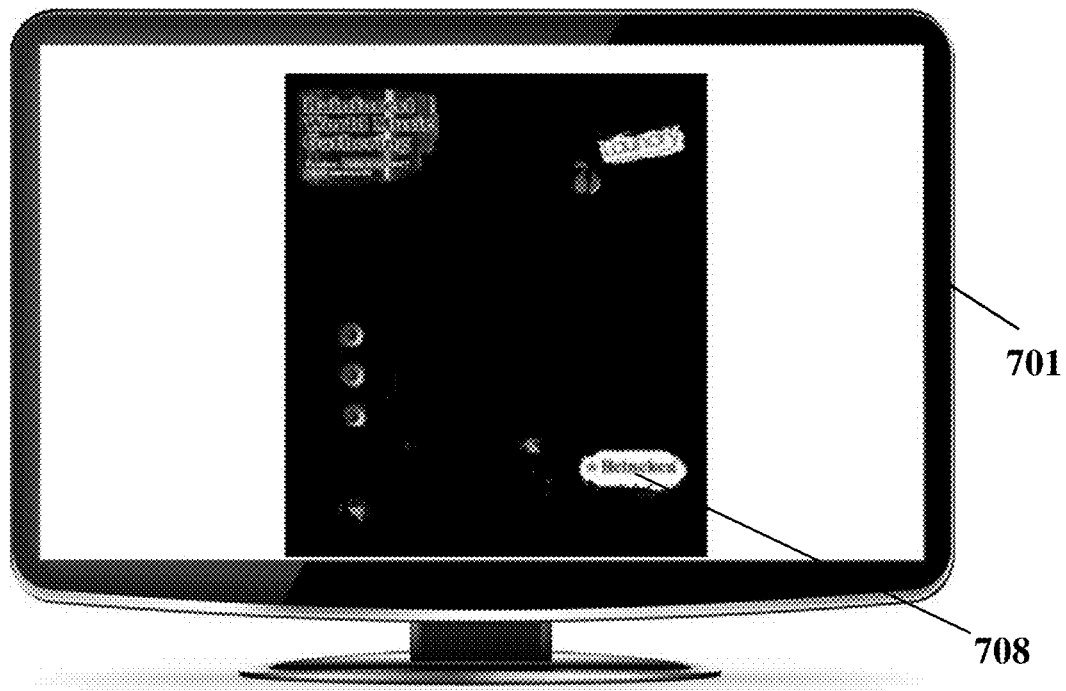

FIG. 7C is a GUI 700*c* displaying an input graphic object 706, according to an illustrative embodiment. A designer may provide the input graphic object 706 to the computer with an instruction to extract color themes from the input graphic object 706. The computer may utilize the neural network to generate an importance map for the input graphic object 706. Utilizing the importance map, the computer may extract a color theme (e.g., a color palette) containing colors from the important regions of the input object 706. FIG. 7D is an updated GUI 700*d* displaying the regions (an example is labelled as 708) from which colors may be extracted for a color theme corresponding to the input graphic object 706.

Figure 8:
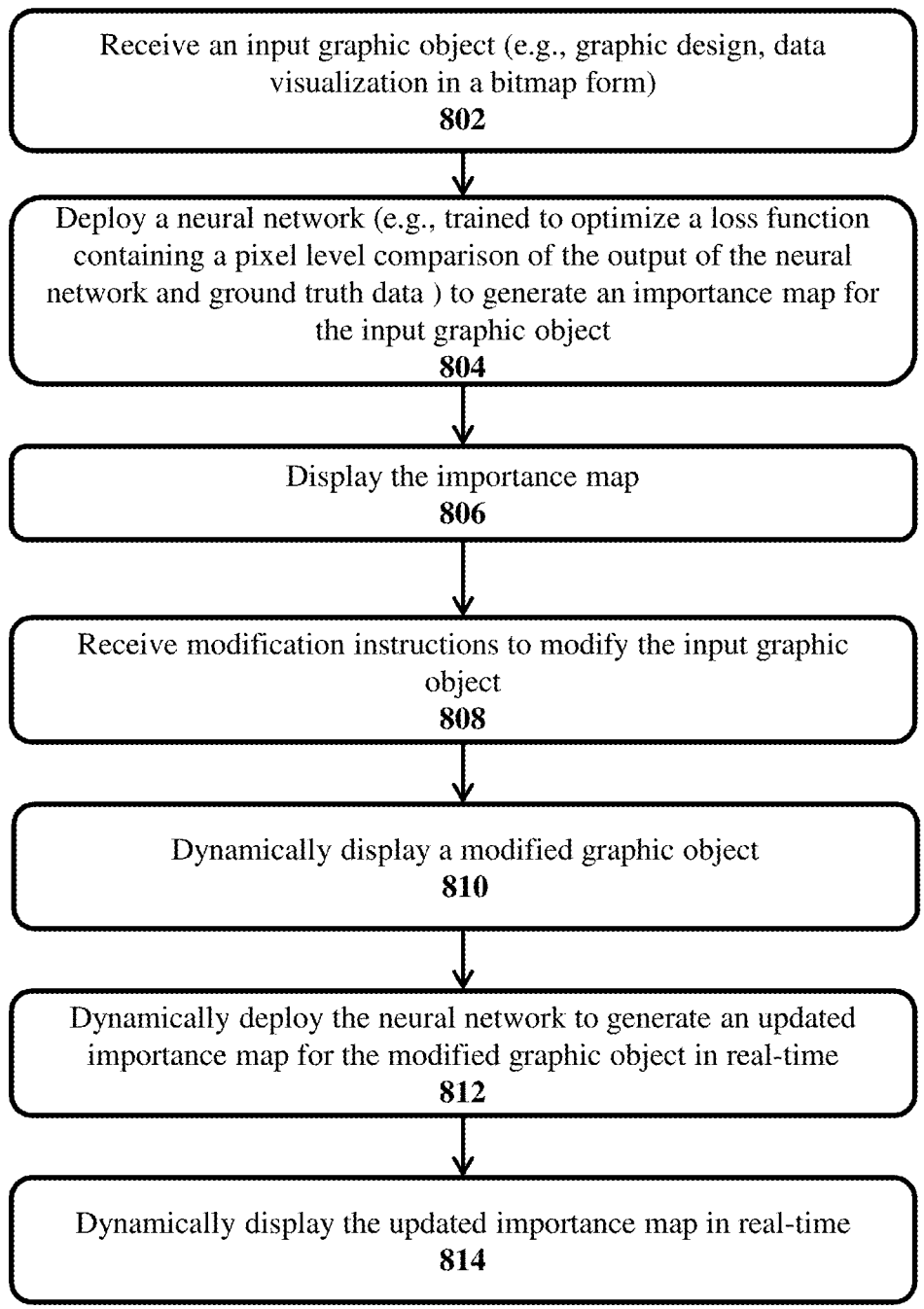
FIG. 8 is a flow diagram of a method of providing a dynamic design feedback, according to an illustrative embodiment.

FIG. 8 is a flow diagram 800 of an illustrative method of providing a dynamic feedback for an input graphic object, according to an embodiment. Although multiple computers, multiple software modules, and multiple databases may implement one or more steps of the method, this description details, for brevity, the steps being implemented by a computer. Furthermore, the steps shown in the flow diagram 800 are merely illustrative, and additional steps or alternative steps should be considered within the scope of this disclosure. Furthermore, one or more of the steps may be skipped during the implementation of the method.

The method may begin at step 802, where the computer may receive an input graphic object. The input graphic object may be a graphic design or a data visualization. In some instances, the computer may display GUI with an upload tool for a user to upload an image, e.g., in a bitmap format, containing the input graphic object. At step 804, the computer may execute or deploy a neural network to generate an importance map for the input graphic object. The neural network may have been trained to optimize a loss function containing a pixel-level comparison of the importance output generated by the neural network and the ground truth dataset. In other words, the neural network may generate a pixel-level importance map for the input graphic object. Therefore, unlike the conventional systems, the neural network does not require a knowledge of underlying data vectors to generate the importance map.

At step 806, the computer may display the importance map. The computer may display the importance map in the GUI side-by-side with the input graphic object. The importance map may be a graphical representation showing each pixel of the graphic object within a range from least important to most important where a higher importance indicates a higher probability that the pixel is viewed by a viewer. For example, the importance map may be analogous to a heat map with different colors or shades of colors to represent the relative importance of various pixels within the input graphic object. At step 808, the computer may receive modification instructions to modify the input graphic object. For example, the user may change the text or images within the graphic object. More particularly, the user may change font, size, or color of the text or rearrange the text or images. The user may also resize, crop, and/or change one or more colors of the picture. At step 810, the computer may dynamically display the modified graphic object. In other words, the computer may update the display of the graphic object as the user may modify the graphic object.

At step 812, the computer may dynamically deploy the neural network to generate an updated importance map for the modified graphic object in real-time. At step 814, the computer may dynamically display the updated importance map in real-time. The updated importance map may represent a modified probability of each pixel in the modified graphic object. By executing the steps of the illustrative method, the computer may provide an interactive tool for a user to modify a graphic object and get a real-time feedback of the visual importance of various regions within the graphic object through the importance map that is updated in real time as the input object is being edited.

Figure 9:
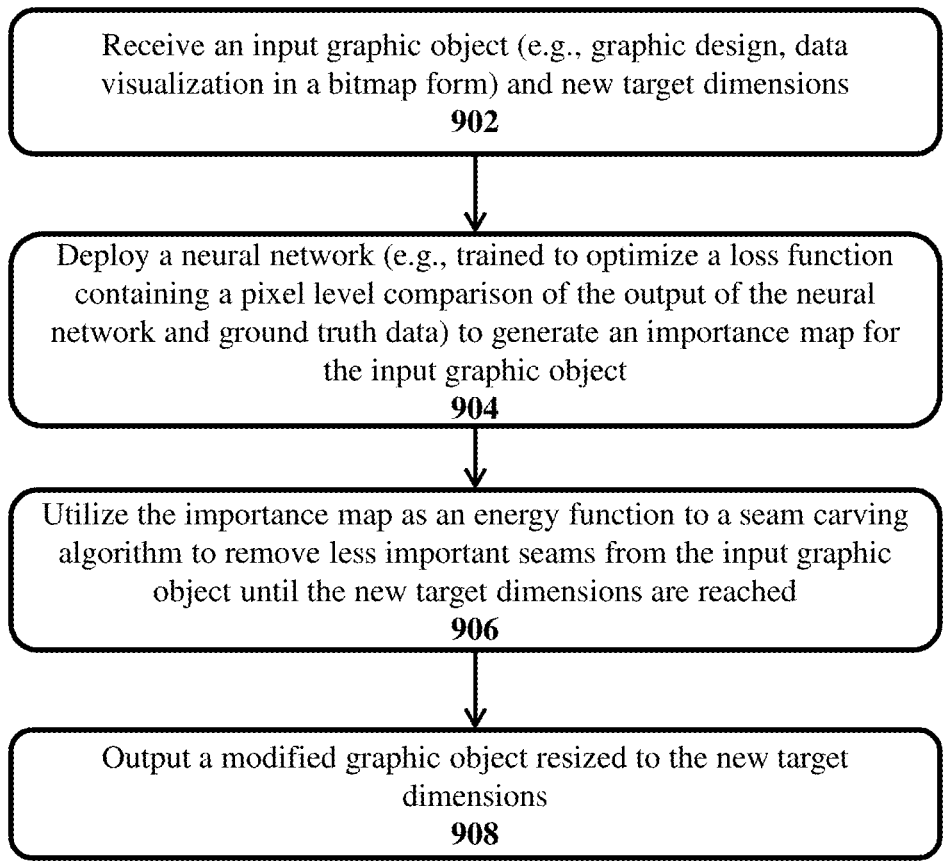
FIG. 9 is a flow diagram of a method of generating a retargeted image of an input graphic object, according to an illustrative embodiment.

FIG. 9 shows a flow diagram 900 of an illustrative method of retargeting an input graphic object, according to an embodiment. Although multiple computers, multiple software modules, and multiple databases may implement one or more steps of the method, this description details, for brevity, the steps being implemented by a computer. Furthermore, the steps shown in the flow diagram 900 are merely illustrative, and additional steps or alternative steps should be considered within the scope of this disclosure. Furthermore, one or more of the steps may be skipped during the implementation of the method.

The method may begin at step 902, where a computer may receive an input graphic object and new target dimensions. The input graphic object may be a graphic design or a data visualization. The new target dimensions may be dimensions of a display or a location on the display for which the input graphic object has to be resized. For example, the input graphic object may have been created for a personal computer (e.g., desktop computer) conforming to the dimensions of a personal computer display. However, the input graphic object may now have to be resized for a mobile phone display associated with the new target dimensions. In another example, a graphic object may have to be displayed at various locations associated with different space constraints affecting the size and/or aspect ratio of the graphic object. Within a webpage, for instance, the graphic object may have to be displayed within the main content, in the margins, or as banner advertisements at the top. Furthermore, different websites may have different space constraints based on the other content (apart from the graphic object) of the websites. Regardless of the space constraints, the resized graphic object may not lose important information presented in the input graphic object.

At step 904, the computer may deploy a neural network to generate an importance map for the input graphic object. The neural network, trained to optimize a loss function containing a pixel level comparison between an output of the neural network and a ground truth, may generate a pixel level importance map without the knowledge of underlying data vector of the input graphic object. Therefore, the input graphic object may be in the form of a bitmap file and the importance map may be a graphical representation showing each pixel of the graphic object within a range from least important to most important where a higher importance indicates a higher probability that the pixel is viewed by a viewer. At step 906, the computer may utilize the importance map as an energy function to a seam carving algorithm to remove less important seams from the input graphic object until the new target dimensions are reached. In other words, the computer may iteratively remove less important seams (or seams with low energy containing least important pixels) from the input graphic object until the input graphic object resizes to the target dimensions. At step 908, the computer may output the modified graphic object resized to the new target dimensions.

Figure 10:
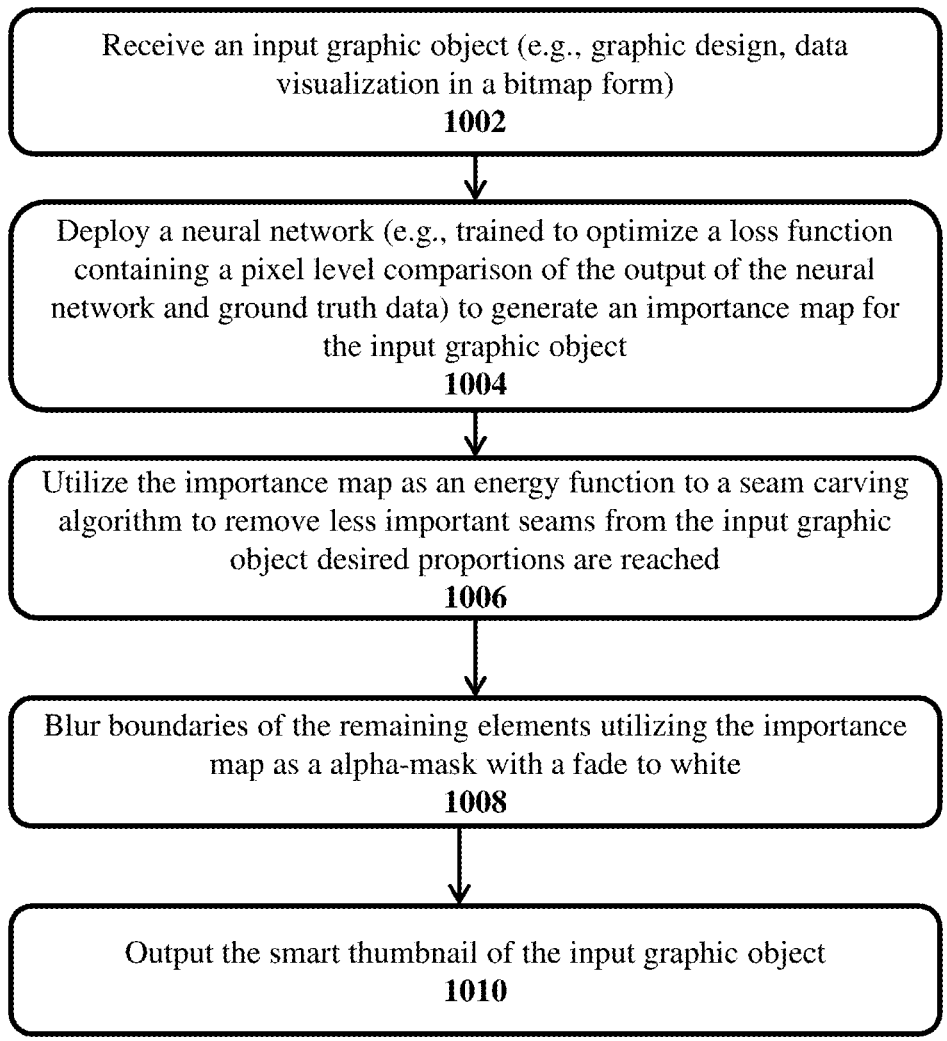
FIG. 10 is a flow diagram of a method of generating a smart thumbnail of an input graphic object, according to an illustrative embodiment.
Figure 11:
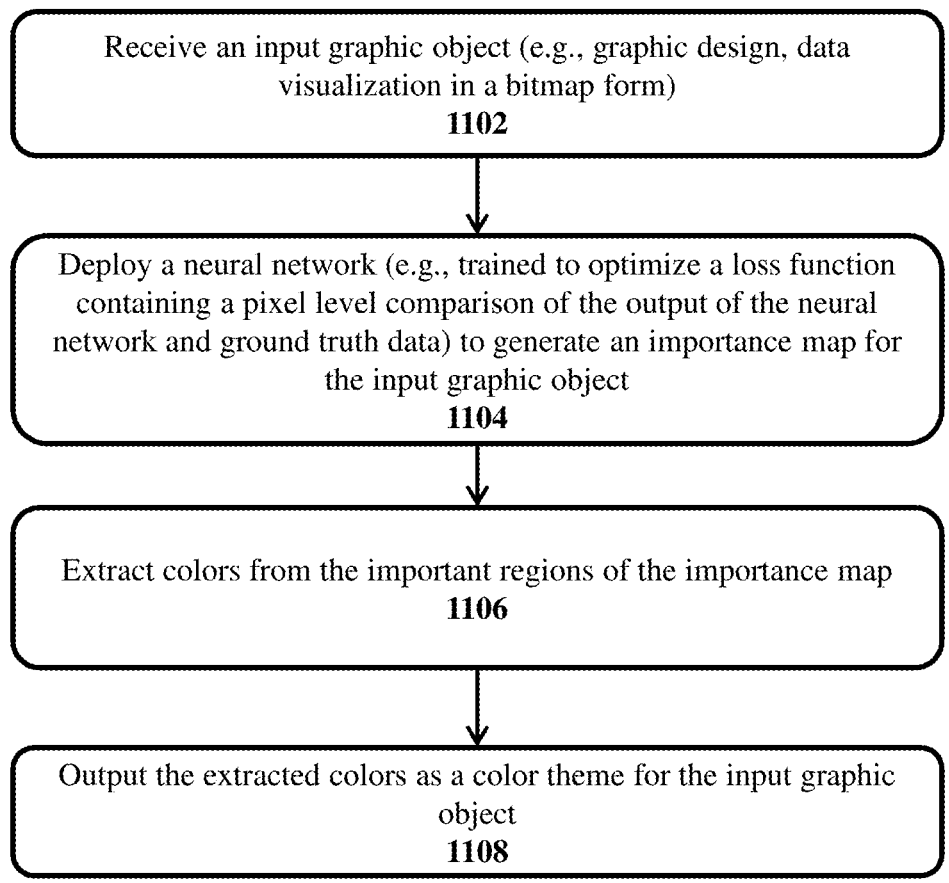
FIG. 11 is a flow diagram of a method of extracting a color theme an input graphic object, according to an illustrative embodiment.

FIG. 10 is a flow diagram of an illustrative method 1000 of generating a smart thumbnail from an input graphic object, according to an embodiment. Although multiple computers, multiple software modules, and multiple databases may implement one or more steps of the method, this description details, for brevity, the steps being implemented by a computer. Furthermore, the steps shown in the process 1000 are merely illustrative, and additional steps or alternative steps should be considered within the scope of this disclosure. Furthermore, one or more of the steps may be skipped during the implementation of the method.

The method may begin at step 1002, where the computer may receive an input graphic object. The input graphic object may be a graphic design or a data visualization. At step 1004, the computer may utilize a neural network to generate an importance map for the input graphic object. The neural network, trained to optimize a loss function containing a pixel level comparison between an output of the neural network and a ground truth, may generate a pixel level importance map without the knowledge of underlying data vector of the input graphic object. Therefore, the input graphic object may be in the form of a bitmap file and the importance map may be a graphical representation showing each pixel of the graphic object within a range from least important to most important where a higher importance indicates a higher probability that the pixel is viewed by a viewer.

At step 1006, the computer may utilize the importance map as an energy function to a seam carving algorithm to remove less important seams from the input graphic object until desired proportions (e.g., equal length and breadth for a square thumbnail) are reached. More particularly, the computer may iteratively remove rows and columns of least important pixels until the input graphic object reaches the desired proportion. Once the desired proportion is reached, the computer may execute step 1008 to blur boundaries of the remaining elements (e.g., regions of the graphic object formed by pixels that are not removed) utilizing the importance map as an alpha-mask with a fade to white to generate a smart thumbnail of the input graphic object. At step 1010, the computer may output the smart thumbnail.

FIG. 10 is a flow diagram of an illustrative method 1100 of generating a color theme of an input graphic object, according to an embodiment. Although multiple computers, multiple software modules, and multiple databases may implement one or more steps of the method, this description details, for brevity, the steps being implemented by a computer. Furthermore, the steps shown in the process 1100 are merely illustrative, and additional steps or alternative steps should be considered within the scope of this disclosure. Furthermore, one or more of the steps may be skipped during the implementation of the method.

The method may begin at step 1102, where the computer may receive an input graphic object. The input graphic object may be a graphic design or a data visualization. At step 1104, the computer may utilize or execute a neural network to generate an importance map for the input graphic object. The neural network, trained to optimize a loss function containing a pixel level comparison between an output of the neural network and a ground truth, may generate a pixel level importance map without the knowledge of underlying data vector of the input graphic object. Therefore, the input graphic object may be in the form of a bitmap file and the importance map may be a graphical representation showing each pixel of the graphic object within a range from least important to most important where a higher importance indicates a higher probability that the pixel is viewed by a viewer. At step 1106, the computer may extract colors from the important regions formed by a set of most important pixels in the importance map. At step 1108, the computer may output the extracted colors as a color theme (or palette) for the input graphic object. The color palette may contain the important colors within the graphic object.

Training the Neural Network

Eye movements have been studied for a long time as a clue to understanding of interfaces. For example, there have been studies of eye gaze and perceptions of designs, however, it is desirable to train and utilize a neural network without measuring eye gaze and perception data. Some methods require human annotations to identify saliency, but these saliency methods require knowledge of design elements (i.e., a vector representation) and require human inputs into a neural network. Other saliency methods may use programmatically-defined elements as input to saliency estimation, but do not allow bitmap images as inputs. Furthermore, any saliency algorithms developed for natural images, with or without using neural networks, fail to accurately predict importance of bitmap images of graphic designs and data visualizations.

To train and test a neural network to generate the importance maps, two types of datasets were used: bubble-view clicks for data visualizations and explicit importance maps for graphic designs. Each of these datasets may be crowd-sourced and may be less expensive than tracking human eye gaze movements. Furthermore, each of these datasets may be feasibly scaled up to thousands of images.

In the bubble-view methodology, crowd workers may be shown a blurry image of a data visualization, and may be instructed to type a text caption describing the image. By clicking on different parts of the image, the crowd workers may reveal small regions—or bubbles—of the image at full resolution. These clicks may be referred to as bubble clicks. The regions with most amount of bubble clicks may be the more important regions within the image of data visualization. In the explicit importance maps methodology, crowd workers may be provided with images with graphic designs and asked to label important regions of designs using binary masks. By averaging the responses, ground truth importance maps of the graphic design may be generated to train and/or test a neural network.

The predication task of the trained neural network therefore may be given an input graphic design or data visualization (collectively referred to as graphic objects) to predict the importance of the depicted content at each pixel location. For instance, if the input graphic design or data visualization is a bitmap image, the output importance prediction at each pixel location i may be $P_i \epsilon [0,1]$, where large output values may indicate high importance. A fully convolutional neural network was trained using the ground truth importances $Q_i \epsilon [0,1]$ generated by one or more of the bubble-view and the explicit importance map methodology to optimize a sigmoid cross entropy loss for parameters $\Theta$ over all pixels $i=1, 2, \ldots, N$. The loss function may be defined as follows:

$$L(\Theta) = -\frac{1}{N}\sum_{i=1}^{N}(Q_i \log P_i + (1-Q_i)\log(1-P_i)),$$

where $P_i = \sigma(f_i(\Theta))$ may be the output prediction of the fully convolutional network $f_i(\Theta)$ composed with a sigmoid function $\sigma(x) = (1+\exp(-x))^{-1}$. It is intended that any neural network-based saliency model trained using a loss function may be used herein so as to provide the same or similar functions as described herein.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. In a digital medium environment, a system comprising:
   at least one processor;
   a non-transitory computer memory comprising a neural network trained to generate importance maps; and
   instructions that, when executed by the at least one processor, cause the system to:
   execute the neural network to generate an importance map for a graphic object, the importance map being a graphical representation showing each pixel of the graphic object within a range from least important to most important where a higher importance indicates a higher probability that a pixel is viewed by a viewer;
   identify a set of pixels in the graphic object being the most important based on the importance map;
   extract a plurality of colors from the set of pixels identified as being most important in the graphic object based on the importance map;

output for display a color palette associated with the graphic object and containing the plurality of colors extracted from the set of pixels identified as being most important in the graphic object based on the importance map;

receive an instruction to modify the graphic object;

generate a new graphic object based on the instruction;

generate an updated importance map based on the new graphic object, wherein the updated importance map represents a modified probability that each pixel in the new graphic object is viewed by the viewer; and generate an updated color palette associated with the new graphic object based on extracting a new plurality of colors from a plurality of pixels in the new graphic object being the most important based on the updated importance map.

2. The system according to claim 1, wherein the graphic object is at least one of graphic design or data visualization.

3. The system according to claim 1, wherein the graphic object is in the form of a bitmap image.

4. In a digital medium environment for generating a representation of a digital image, a method comprising:

generating, by a computer with a neural network, an importance map for a graphic object, the importance map being a graphical representation showing each pixel of the graphic object within a range from least important to most important where a higher importance indicates a higher probability that a pixel is viewed by a viewer;

identifying, by the computer with the neural network, a set of pixels in the graphic object being the most important based on the importance map;

extracting a plurality of colors from the set of pixels identified as being most important in the graphic object based on the importance map;

outputting for display a color palette associated with the graphic object and containing the plurality of colors extracted from the set of pixels identified as being most important in the graphic object based on the importance map;

receiving an instruction to modify the graphic object;

generating a new graphic object based on the instruction;

generating an updated importance map based on the new graphic object, wherein the updated importance map represents a modified probability that each pixel in the new graphic object is viewed by the viewer;

and generating an updated color palette associated with the new graphic object based on extracting a new plurality of colors from a set of pixels in the new graphic object being the most important based on the updated importance map.

5. The method according to claim 4, wherein the graphic object is at least one of graphic design or data visualization.

6. The method according to claim 4, wherein the graphic object is in the form of a bitmap image.

7. The system according to claim 1, wherein the color palette contains a user specified number of colors.

8. The system according to claim 1, further comprising highlighting regions of the graphic object a viewer is likely to view or unlikely to view.

9. The system according to claim 8, further comprising extracting a plurality of colors from the highlighted regions of the graphic object a viewer is likely to view.

10. The system according to claim 1, wherein the color palette contains important colors within the graphic object.

11. The method according to claim 4, wherein the color palette contains a user specified number of colors.

12. The method according to claim 4, further comprising highlighting regions of the graphic object a viewer is likely to view or unlikely to view.

13. The method according to claim 12, further comprising extracting a plurality of colors from the highlighted regions of the graphic object a viewer is likely to view.

14. A computer system comprising:

one or more hardware processors and memory configured to provide computer program instructions to the one or more hardware processors;

the system configured to use the one or more hardware processors, the system comprising:

means for executing a neural network to generate an importance map for a graphic object, the importance map being a graphical representation showing each pixel of the graphic object within a range from least important to most important where a higher importance indicates a higher probability that a pixel is viewed by a viewer;

means for identifying a set of pixels being the most important in the graphic object based on the importance map;

means for extracting a plurality of colors from the set of pixels identified as being most important in the graphic object based on the importance map;

means for outputting for display a color palette associated with the graphic object and containing the plurality of colors extracted from the set of pixels identified as being most important in the graphic object based on the importance map;

means for receiving an instruction to modify the graphic object;

means for generating a new graphic object based on the instruction;

means for generating an updated importance map based on the new graphic object, wherein the updated importance map represents a modified probability that each pixel in the new graphic object is viewed by the viewer; and means for generating an updated color palette associated with the new graphic object based on extracting a new plurality of colors from a set of pixels in the new graphic object being the most important based on the updated importance map.

15. The system according to claim 14, wherein the color palette contains a user specified number of colors.

16. The system according to claim 14, further comprising means for highlighting regions of the graphic object a viewer is likely to view or unlikely to view.

17. The system according to claim 16, further comprising means for extracting a plurality of colors from the highlighted regions of the graphic object a viewer is likely to view.

* * * * *